United States Patent
Qiao et al.

(10) Patent No.: US 11,570,668 B2
(45) Date of Patent: *Jan. 31, 2023

(54) RELEASE OF A SECOND SESSION OF A WIRELESS DEVICE BY AN ACCESS AND MOBILITY MANAGEMENT FUNCTION

(71) Applicant: Ofinno, LLC, Reston, VA (US)

(72) Inventors: Weihua Qiao, Herndon, VA (US);
Esmael Dinan, McLean, VA (US);
Kyungmin Park, Herndon, VA (US);
Peyman Talebi Fard, Sterling, VA (US)

(73) Assignee: Ofinno, LLC, Reston, VA (US)

( * ) Notice: Subject to any disclaimer, the term of this patent is extended or adjusted under 35 U.S.C. 154(b) by 171 days.

This patent is subject to a terminal disclaimer.

(21) Appl. No.: 16/990,529

(22) Filed: Aug. 11, 2020

(65) Prior Publication Data

US 2020/0374764 A1 Nov. 26, 2020

Related U.S. Application Data

(63) Continuation of application No. 16/146,805, filed on Sep. 28, 2018, now Pat. No. 10,743,221.

(60) Provisional application No. 62/564,323, filed on Sep. 28, 2017.

(51) Int. Cl.
*H04W 36/00* (2009.01)
*H04W 36/10* (2009.01)
*H04W 36/38* (2009.01)

(52) U.S. Cl.
CPC ....... *H04W 36/0033* (2013.01); *H04W 36/10* (2013.01); *H04W 36/38* (2013.01)

(58) Field of Classification Search
None
See application file for complete search history.

(56) References Cited

U.S. PATENT DOCUMENTS 10,743,221 B2 * 8/2020 Qiao ................. H04W 36/0033
2020/0059989 A1 * 2/2020 Velev .................... H04W 76/32

OTHER PUBLICATIONS

3GPP TS 23.060 V14.4.0 (Jun. 2017); Technical Specification; 3rd Generation Partnership Project; Technical Specification Group Services and System Aspects; General Packet Radio Service (GPRS); Service description; Stage 2; (Release 14).
3GPP TS 23.401 V15.0.0 (Jun. 2017); Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 15).

(Continued)

*Primary Examiner* — James P Duffy
(74) *Attorney, Agent, or Firm* — Sachin Kandhari; Kavon Nasabzadeh; Philip R. Smith

(57) ABSTRACT

A source access and mobility management function (AMF) sends, to a target AMF, a first message indicating: a handover of a wireless device; and a source session management function (SMF). A second message causing a release of at least one second session of the wireless device is received from the target AMF. A request for the release of the at least one second session is sent to the source SMF. An indication (Continued)

of completion of the release is received from the source SMF. An indication of the completion of the release is sent to the target AMF.

20 Claims, 24 Drawing Sheets

(56) References Cited

OTHER PUBLICATIONS

3GPP TS 23.402 V15.0.0 (Jun. 2017); Technical Specification; 3rd Generation Partnership Project; Technical Specification Group Services and System Aspects; Architecture enhancements for non-3GPP accesses (Release 15).
3GPP TS 23.501 V1.3.0 (Sep. 2017); Technical Specification; 3rd Generation Partnership Project; Technical Specification Group Services and System Aspects; System Architecture for the 5G System; Stage 2 (Release 15).
3GPP TS 23.502 V1.0.0 (Sep. 2017); Technical Specification; 3rd Generation Partnership Project; Technical Specification Group Services and System Aspects; Procedures for the 5G System; Stage 2 (Release 15).
3GPP TR 23.799 V14.0.0 (Dec. 2016); Technical Report; 3rd Generation Partnership Project; Technical Specification Group Services and System Aspects; Study on Architecture for Next Generation System (Release 14).
S2-174517; SA WG2 Meeting #122; Jun. 26-30, 2017 San Jose Del Cabo, Mexico (revision of S2-17xxxx); Source: ETRI, KT; Title: TS 23.502 UPF relocation during registration procedure.
S2-174542; SA WG2 Meeting #122; Jun. 26-30, 2017, San Jose Del Cabo, Mexico; Source: Huawei, HiSilicon Title: SMF selection in roaming case.
S2-174617; SA WG2 Meeting #122; Jun. 26-30, 2017 San Jose Del Cabo, Mexico (revision of S2-17xxxx); Source: Samsung; Title: 23.502: Update of UE triggered Service Request in CM-CONNECED state.
S2-175163; SA WG2 Meeting #122; Jun. 26-30, 2017 Cabo, Mexico; Source: Huawei, HiSilicon Title: SMF relocation of SSC mode 2 and SSC mode 3 with multiple PDU sessions.
3GPP TR 33.899 V1.3.0 (Aug. 2017); 3rd Generation Partnership Project; Technical Specification Group Services and System Aspects; Study on the security aspects of the next generation system (Release 14).
International Search Report and Written Opinion dated Dec. 5, 2018, in PCT Application No. PCT/US2018/053534.
S2-172816; SA WG2 Meeting #120; Mar. 27-31, 2017 Busan, Korea; (revision of S2-172713); Source: Ericsson; Title: Handover procedure; Document for: Approval; Agenda Item: 6.5.2; Work Item / Release: 5GS_Ph1 / Rel-15.
S2-176778; SA WG2 Meeting #122E e-meeting; Sep. 11-15, 2017, Elbonia; was S2-17xxxx; Source: Ericsson (Rapporteur 23.502); Title: TS 23.502: 5GS Terminology and other corrections; Document for: Approval; Agenda Item: 21; Work Item / Release: 5G_ph1 / Rel-15.

* cited by examiner

Receive, by a target AMF from a source AMF, a 1st message comprising 1st parameter(s) of a SMF; and identifier(s) of a PDU session(s) of a wireless device, where the source SMF maintains the PDU session(s)
1910

Select, by the target AMF, a target SMF different from the source SMF
1920

Send, by the target AMF to the target SMF, a 2nd message comprising: identifier(s) of 1st PDU session(s), and a user identity of the wireless device
1930

Receive, by the target AMF from a target base station, a handover notify message indicating that a handover of the wireless device is successful
1940

Send, by the target AMF to the source AMF and in response to receiving the handover notify message, a 3rd message requesting release of the PDU session(s)
1950

FIG. 19

Receive, by a target AMF from a source AMF, a 1st message comprising 1st parameter(s) of a SMF; and identifier(s) of a PDU session(s) of a wireless device, where the source SMF maintains the PDU session(s)
2010

Select, by the target AMF, a target SMF different from the source SMF
2020

Send, by the target AMF to the target SMF, a 2nd message comprising: identifier(s) of PDU session(s), and a user identity of the wireless device
2030

Receive, by the target AMF from a target base station, a handover notify message indicating that a handover of the wireless device is successful
2040

Send, by the target AMF to the source SMF and in response to receiving the handover notify message, a 3rd message requesting release of the PDU session(s)
2050

FIG. 20

Receive, by a target SMF from a target AMF, a 1st message comprising: identifier(s) of PDU session(s) of a wireless device; and a 1st IP address of the wireless device
2110

Send, by the target SMF to a policy control function, a 2nd message requesting for polic(ies) of the PDU session(s) of the wireless device, where the 2nd message comprises: a handover indication that a source AMF and a source SMF are relocated; the 1st IP address; and a 2nd IP address of the wireless device
2120

Receive, by the target SMF from the policy control function, a 3rd message in response to the 2nd message, where the 3rd message comprises polic(ies)
2130

Sending, by the target SMF to a UPF, a 4th message requesting a user plane session establishment or modification for the PDU session(s), where the 4th message comprises: a handover indication that the source SMF is relocated; and the 2nd IP address
2140

Receiving, by the target SMF from the UPF, a 5th message confirming the user plane session establishment or modification
2150

FIG. 21

RELEASE OF A SECOND SESSION OF A WIRELESS DEVICE BY AN ACCESS AND MOBILITY MANAGEMENT FUNCTION

CROSS-REFERENCE TO RELATED APPLICATIONS

This application is a continuation of U.S. patent application Ser. No. 16/146,805, filed Sep. 28, 2018, which claims the benefit of U.S. Provisional Application No. 62/564,323, filed Sep. 28, 2017, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 19 is an example call flow diagram as per an aspect of an embodiment of the present invention.

FIG. 20 is an example call flow diagram as per an aspect of an embodiment of the present invention.

FIG. 21 is an example call flow diagram as per an aspect of an embodiment of the present invention.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
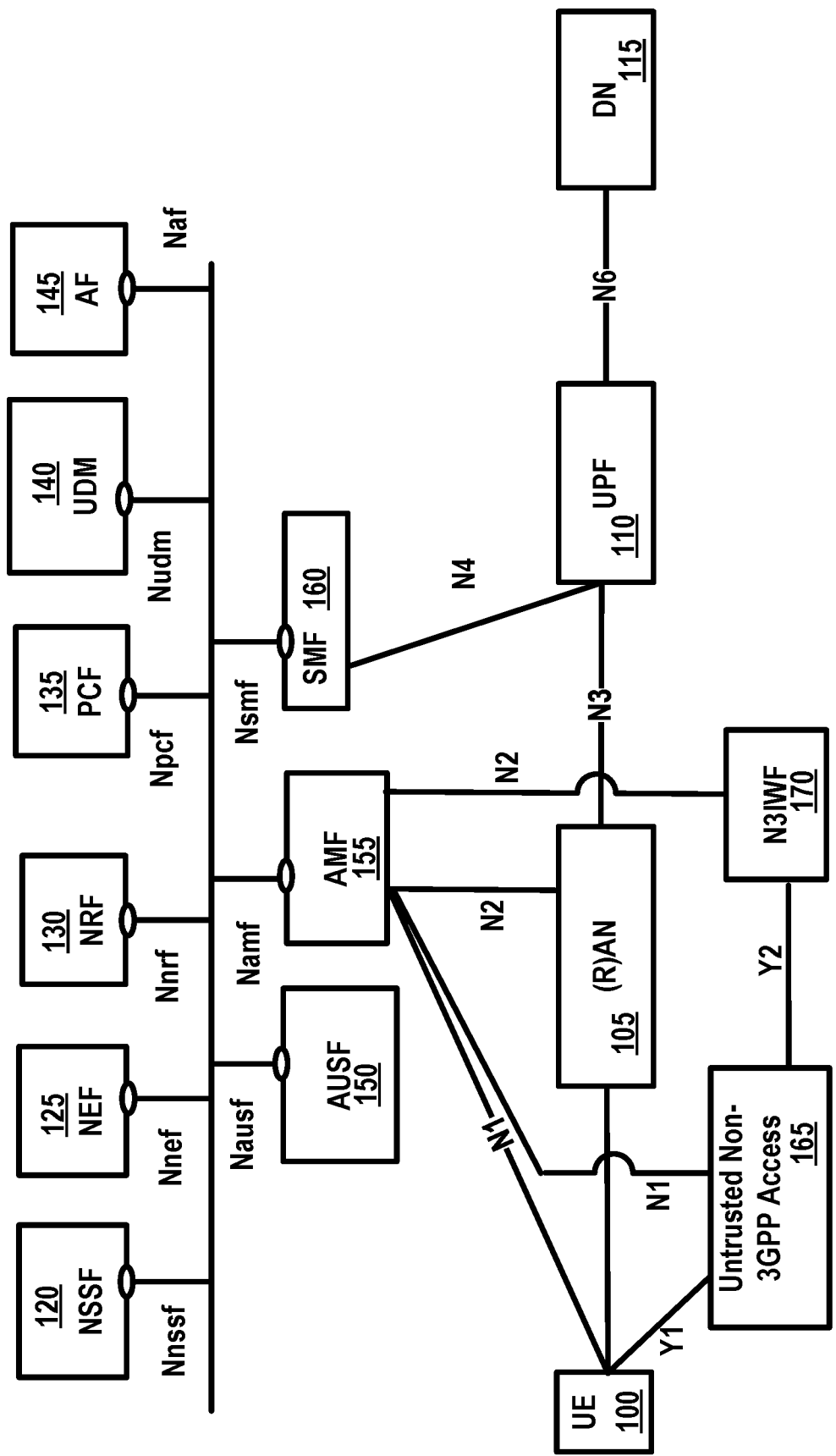
FIG. 1 is a diagram of an example 5G system architecture as per an aspect of an embodiment of the present invention.
Figure 2:
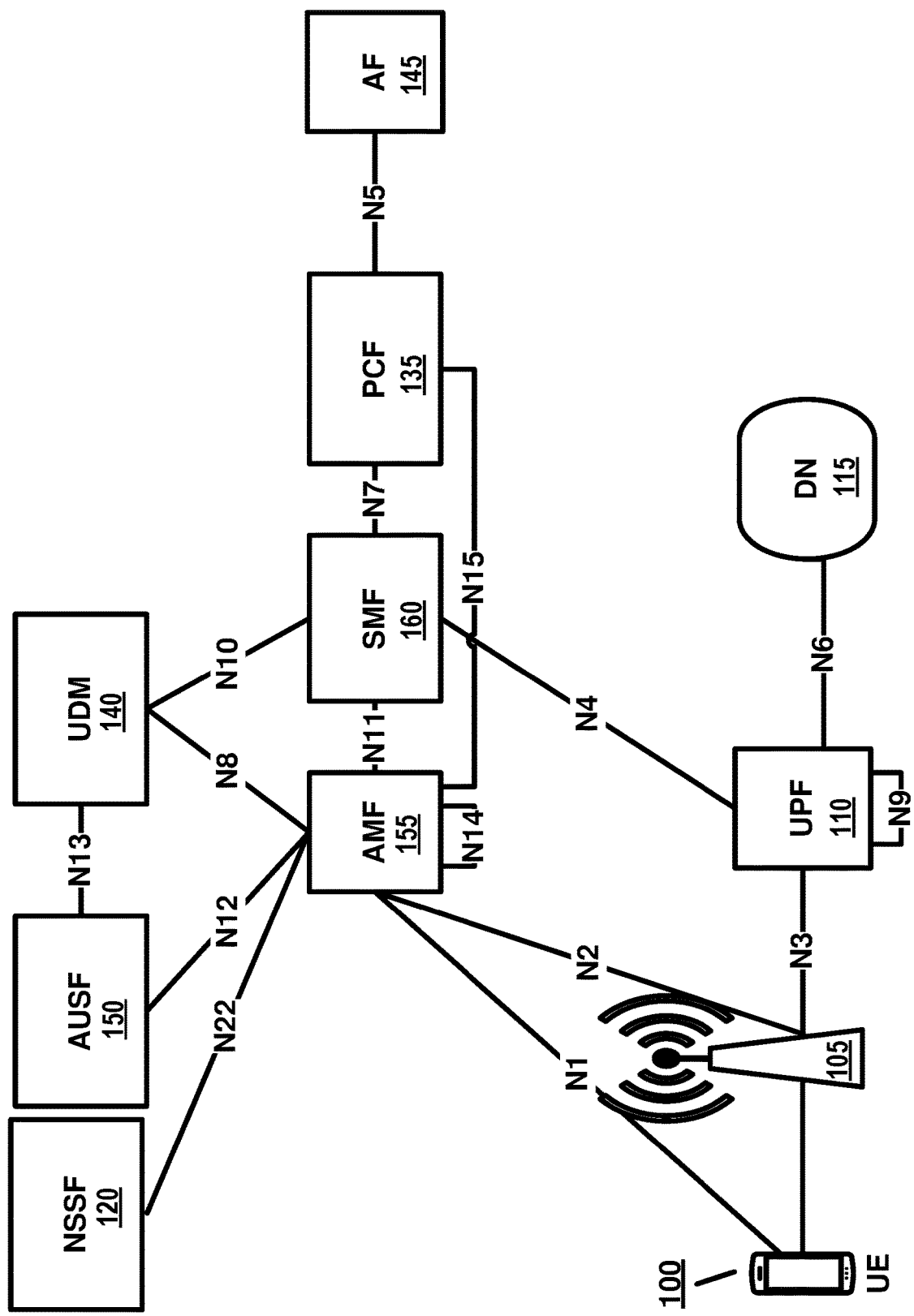
FIG. 2 is a diagram of an example 5G System architecture as per an aspect of an embodiment of the present invention.

The following acronyms are used throughout the present disclosure:

5G 5th generation mobile networks
5GC 5G Core Network
5GS 5G System
5G-AN 5G Access Network
5QI 5G QoS Indicator
AF Application Function
AMF Access and Mobility Management Function
AN Access Network
CDR Charging Data Record
CCNF Common Control Network Functions
CN Core Network
CP Control Plane
DL Downlink
DN Data Network
DNN Data Network Name
LADN Local Area Data Network
LI Lawful Intercept
MICO Mobile Initiated Connection Only
MME Mobility Management Entity
N3IWF Non-3GPP InterWorking Function
NAI Network Access Identifier
NAS Non Access Stratum
NEF Network Exposure Function
NF Network Function
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet Data Unit
PEI Permanent Equipment Identifier
PLMN Public Land Mobile Network
RAN Radio Access Network
QFI QoS Flow Identity
RM Registration Management
SBA Service Based Architecture
SEA Security Anchor Function
SCM Security Context Management
SMF Session Management Function
SMSF SMS Function
S-NSSAI Single Network Slice Selection Assistance information
SUPI Subscriber Permanent Identifier
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise a NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces are employed for communication among the functional elements and/or network elements.

Figure 3:
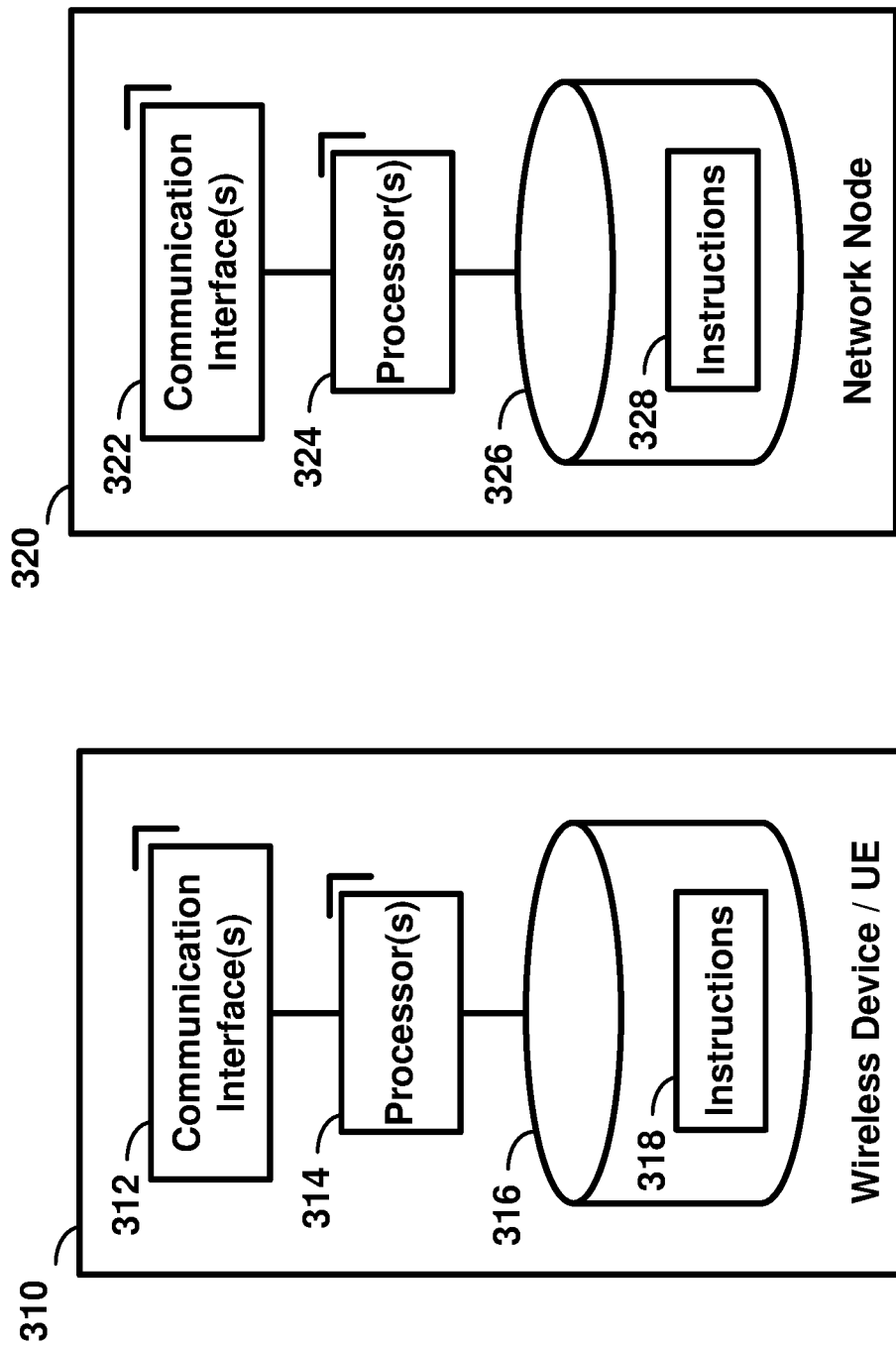
FIG. 3 is a system diagram of an example wireless device and a network node in a 5G system as per an aspect of an embodiment.
Figure 4:
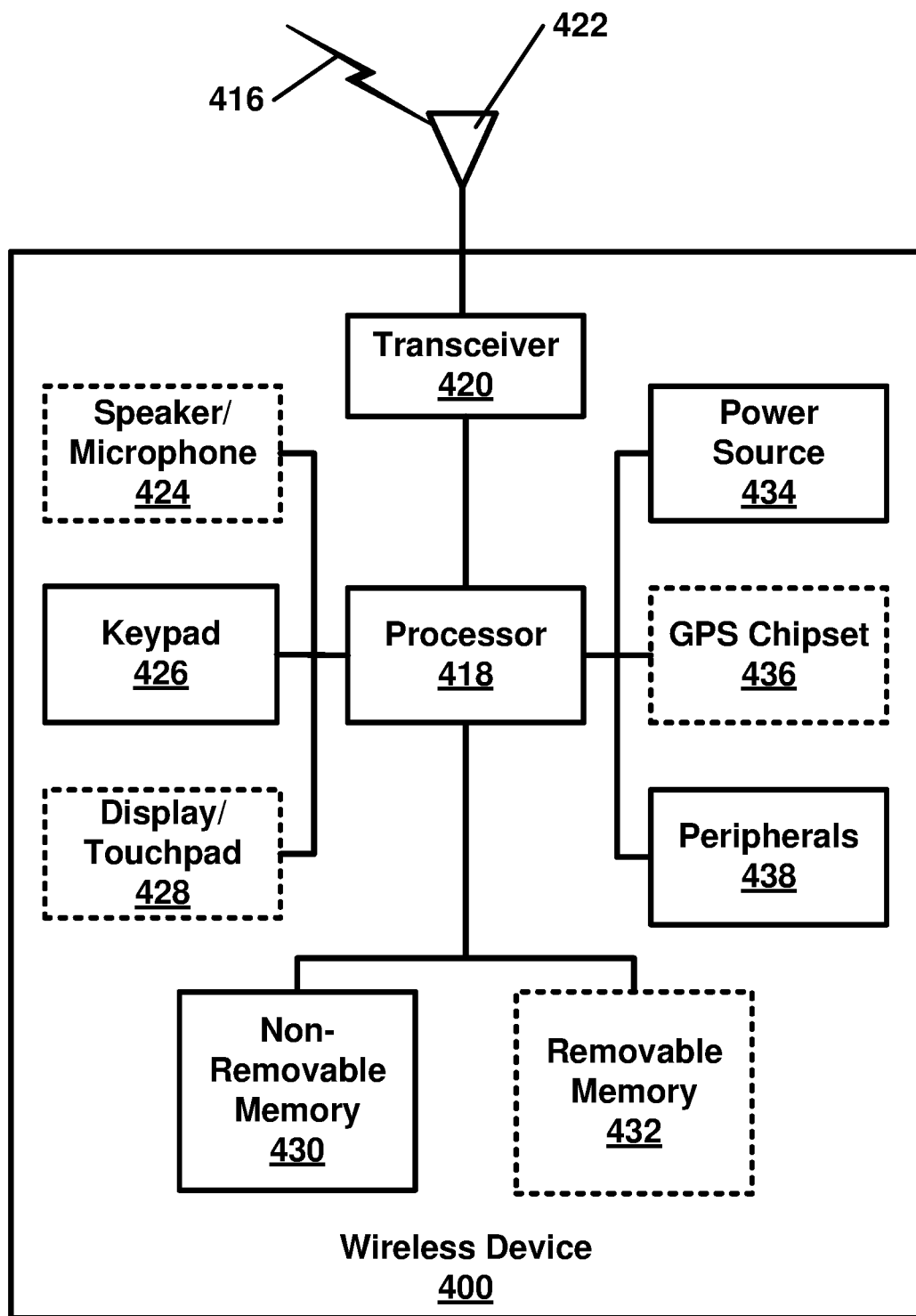
FIG. 4 is a system diagram of an example wireless device as per an aspect of an embodiment.

A network function may be a processing function in a network, which has a functional behavior and interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

Access and mobility management function, AMF 155, may include the following functionalities (some of the AMF functionalities may be supported in a single instance of an AMF 155): termination of RAN CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys.

The AMF 100 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP and non-3GPP accesses 105, 165 simultaneously, support of a coordinated RM context valid over 3GPP and non 3GPP accesses 105, 165, support of CM management contexts for the UE 100 for connectivity over non-3GPP access. Some of functionalities described above may be supported in an instance of a network slice.

In an example, an AMF 155 region may comprise of one or multiple AMF 100 sets. AMF 155 set comprises of some AMFs 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that has been provisioned in a UE 100. DN 115 access identifier (DNAI), for a DNN, may be an identifier of a user plane access to a DN 115. Initial registration may be related to a UE 100 registration in RM-DEREGISTERED 500, 520 state. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

The session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115. One or more of functionalities described above may be required to be supported in an instance of a network slice.

The user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering and downlink data notification triggering. One or more of functionalities described above may be supported in an instance of a network slice.

The UE 100 IP address management may include allocation and release of the UE 100 IP address as well as renewal of the allocated IP address, where applicable. The UE 100 sets the requested PDU type during the PDU session establishment procedure based on its IP stack capabilities and configuration. In an example, the SMF 160 may select PDU type of a PDU session as follows: If the SMF 160 receives a request with PDU type set to IP, the SMF 160 may select either PDU type IPv4 or IPv6 based on DNN configuration and operator policies. A SMF 160 may also provide a cause value to the UE 100 to indicate whether the other IP version is supported on the DNN. If the other IP version is supported, UE 100 may request another PDU Session to the same DNN for the other IP version. If the SMF 160 receives a request for PDU type IPv4 or IPv6 and the requested IP version is supported by the DNN the SMF selects the requested PDU type.

In an example embodiment, the 5GC elements and UE 100 support the following mechanisms: during PDU session establishment procedure, the SMF 160 may send the IP address to the UE 100 via SM NAS signaling. The IPv4 address allocation and/or IPv4 parameter configuration via DHCPv4 may also be employed once PDU session is established. IPv6 prefix allocation may be supported via IPv6 stateless autoconfiguration, if IPv6 is supported. IPv6 parameter configuration via stateless DHCPv6 may also be supported.

The 5GC may support the allocation of a static IPv4 address and/or a static IPv6 prefix based on subscription information in the UDM 140 or based on the configuration on a per-subscriber, per-DNN basis.

User plane function(s) (UPF(s) 110) may handle the user plane path of PDU sessions. A UPF 110 that provides the interface to a data network supports the functionality of a PDU session anchor.

The policy control function, PCF 135, may support unified policy framework to govern network behavior, provide policy rules to control plane function(s) to enforce them, implement a front end to access subscription information relevant for policy decisions in a user data repository (UDR).

The network exposure function, NEF 125, may provide a means to securely expose the services and capabilities provided by the 3GPP network functions, translate between information exchanged with the AF 145 and information exchanged with the internal network functions, receive information from other network functions.

The NF repository function, NRF 130 may support service discovery function that receives NF discovery request from NF instance, provide the information of the discovered NF instances (be discovered) to the NF instance, and maintain the information of available NF instances and their supported services.

The unified data management, UDM 140, may comprise of the application front end (FE) that includes the UDM-FE that is in charge of processing credentials, location management, subscription management and the PCF 135 in charge of policy control; and the user data repository, UDR, that stores data required for functionalities provided by UDM-FE, plus policy profiles required by the PCF 135.

The NSSF may support selecting the set of network slice instances serving the UE 100, determining the Allowed NSSAI, determining the AMF 155 set to be employed to serve the UE 100, and/or, based on configuration, determining a list of candidate AMF(s) 155, possibly by querying the NRF 130.

The data stored in the UDR include at least user subscription data, including at least subscription identifiers, security credentials, access and mobility related subscription data and/or session related subscription data and/or policy data.

The AUSF 150 may support authentication server function (AUSF). The functionality of N3IWF 170 in case of untrusted non-3GPP access 165 may include at least one or more of the following: support of IPsec tunnel establishment with the UE; the N3IWF 170 may terminate the IKEv2/IPsec protocols with the UE 100 over NWu and may relay over N2 the information needed to authenticate the UE 100 and authorize its access to the 5G core network; termination of N2 and N3 interfaces to 5G Core Network for Control-Plane and user-plane respectively; Relaying uplink and downlink control-plane NAS (N1) signaling between the UE 100 and AMF 155; Handling of N2 signaling from SMF 160 (relayed by AMF 155) related to PDU sessions and QoS; Establishment of IPsec Security Association (IPsec SA) to support PDU session traffic; Relaying uplink and downlink user-plane packets between the UE 100 and UPF 110; Enforcing QoS corresponding to N3 packet marking, considering QoS requirements associated to such marking received over N2; N3 user-plane packet marking in the uplink; and/or local mobility anchor within untrusted non-3GPP access networks 165 using MOBIKE; Supporting AMF 155 selection.

The application function, AF 145, may interact with the 3GPP core network to provide services. Based on operator deployment, application functions may be trusted by the operator to interact directly with relevant network functions. Application functions not allowed by the operator to access directly the network functions may use the external exposure framework (via the NEF 125) to interact with relevant network functions.

The control plane interface between the (R)AN 105 and the 5G core may support connection of multiple different kinds of AN(s) (e.g. 3GPP RAN 105, N3IWF 170 for Untrusted access 165) to the 5GC via a unique control plane protocol. A single N2 AP protocol may be employed for both the 3GPP access 105 and non-3GPP access 165; and decoupling between AMF 155 and other functions such as SMF 160 that may need to control the services supported by AN(s) (e.g. control of the UP resources in the AN 105 for a PDU session).

The 5GC may be able to provide policy information from the PCF 135 to the UE 100. Such policy information may include but not limited to the following: access network discovery & selection policy, UE 100 route selection policy (URSP) that groups to or more of SSC mode selection policy (SSCMSP), network slice selection policy (NSSP), DNN selection policy, and non-seamless offload policy.

The 5G core network may support the connectivity of a UE 100 via non-3GPP access networks 165. As shown in example FIG. 5, the registration management, RM may be employed to register or de-register a UE/user 100 with the network, and establish the user context in the network. Connection management may be employed to establish and release the signaling connection between the UE 100 and the AMF 155.

A UE 100 may need to register with the network to receive services that require registration. Once registered and if applicable the UE 100 may update its registration with the network periodically in order to remain reachable (periodic registration update); or upon mobility (mobility registration update); or to update its capabilities or re-negotiate protocol parameters.

Figure 8A:
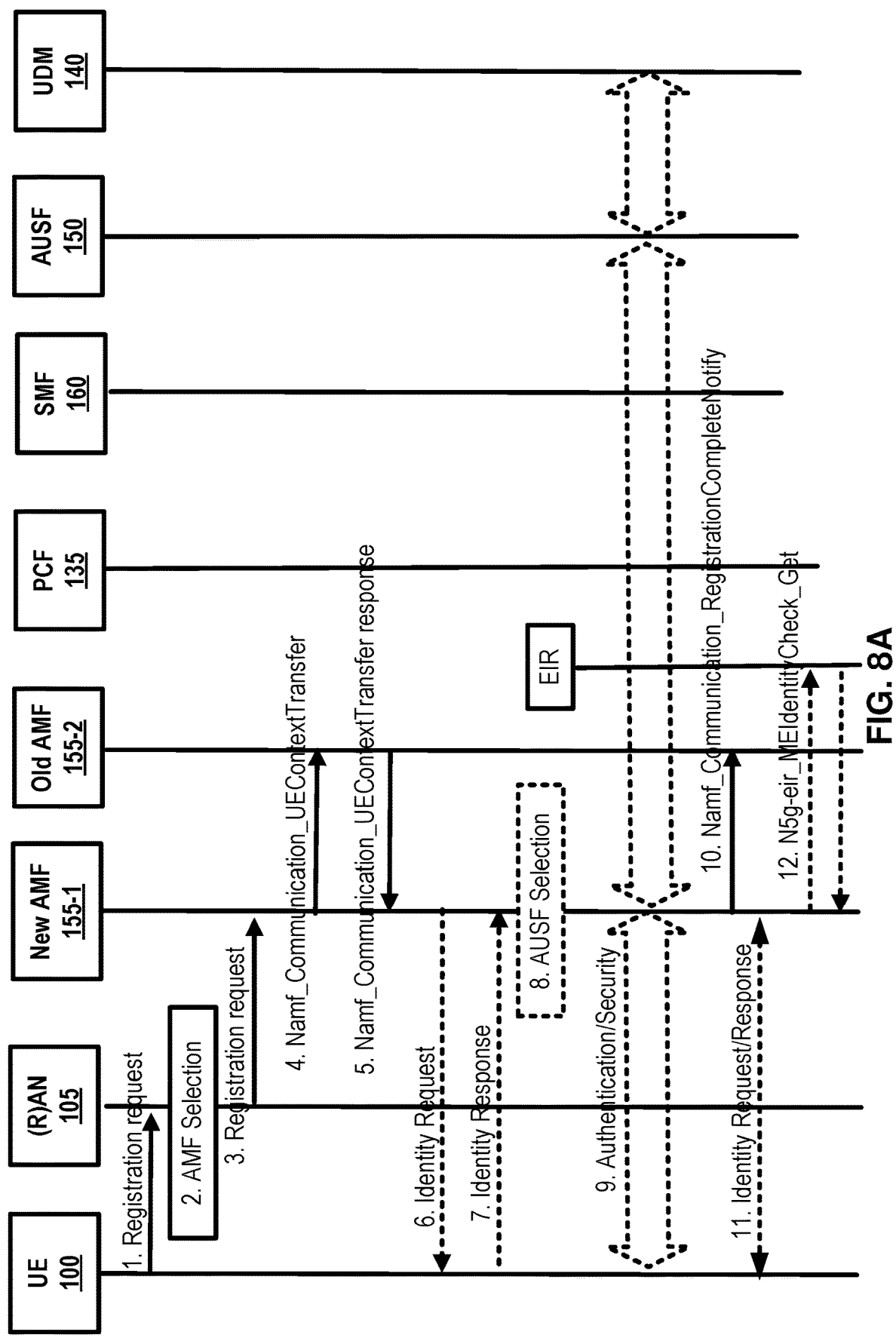
FIG. 8A and FIG. 8B are example call flow diagram as per an aspect of an embodiment.
Figure 8B:
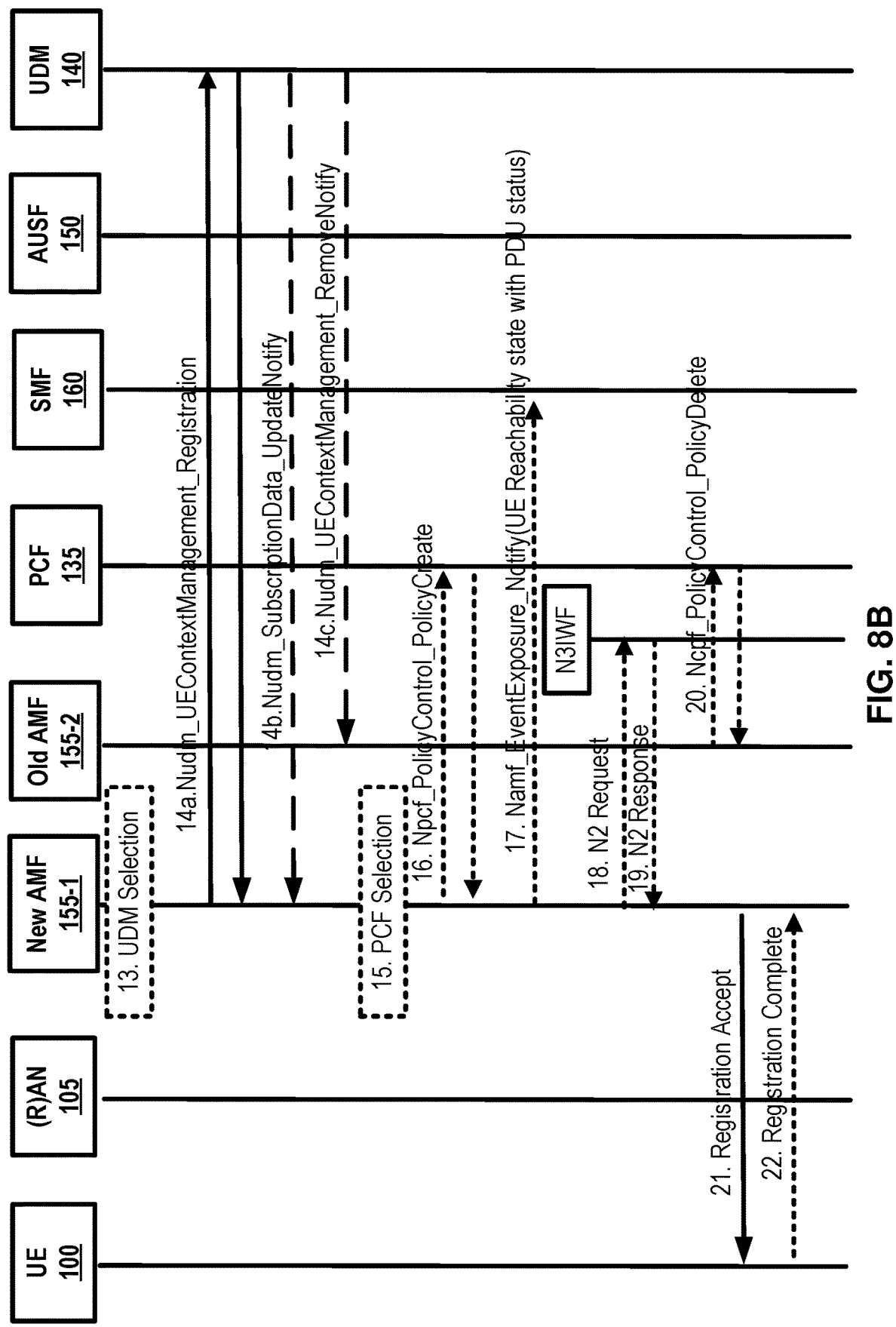

The initial registration procedure as depicted in example FIG. 8A and FIG. 8B may involve execution of network access control functions (e.g. user authentication and access authorization based on subscription profiles in UDM 140). As result of the registration procedure, the identity of the serving AMF 155 may be registered in UDM 140.

The registration management, RM procedures may be applicable over both 3GPP access 105 and non 3GPP access 165.

Figure 5:
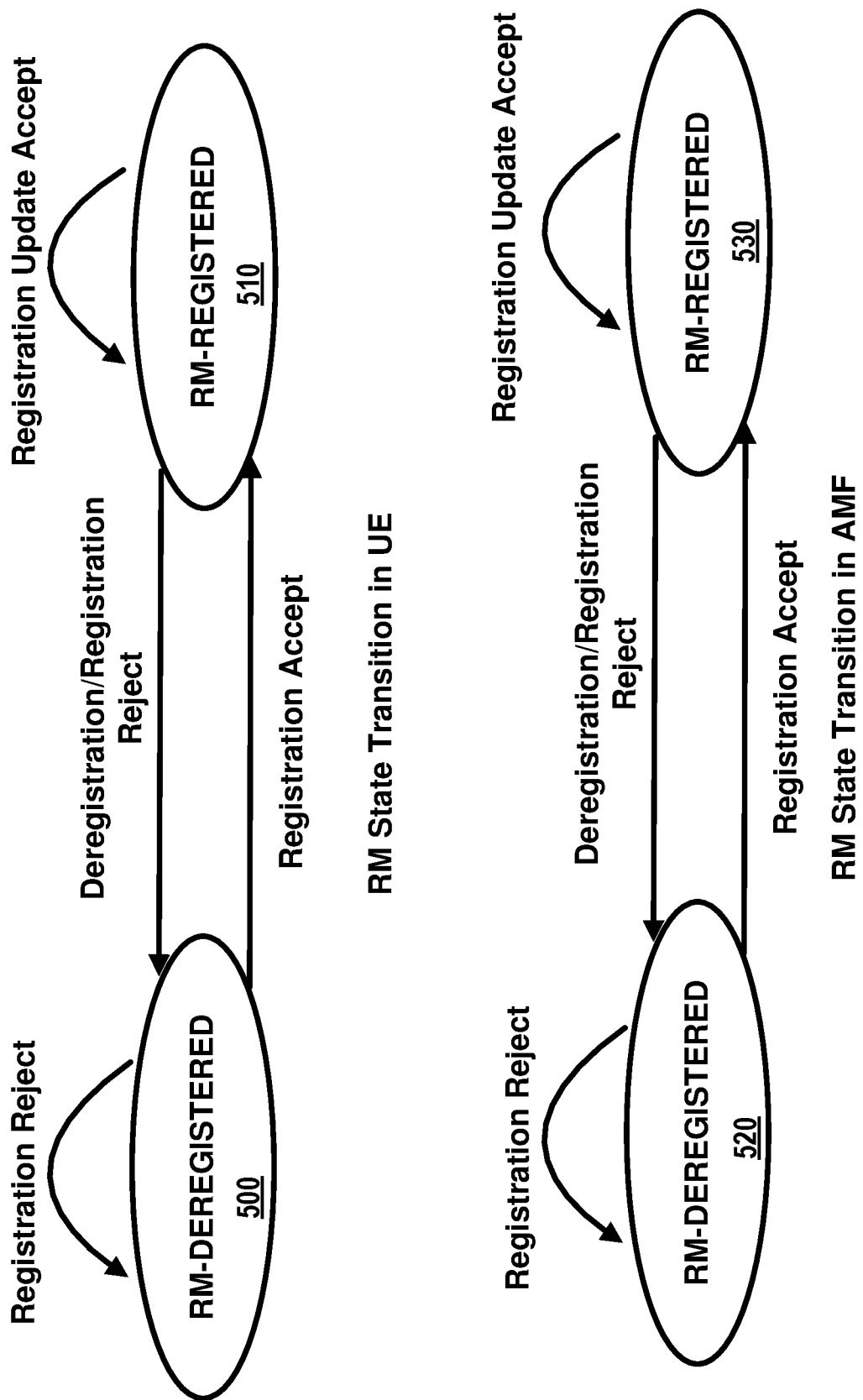
FIG. 5 depicts two registration management state models in UE 100 and AMF 155 as per an aspect of an embodiment.

An example FIG. 5 depicts the RM states of a UE 100 as observed by the UE 100 and AMF 155. In an example embodiment, two RM states may be employed in a UE 100 and the AMF 155 that reflect the registration status of the UE 100 in the selected PLMN: RM-DEREGISTERED 500, and RM-REGISTERED 510. In the RM DEREGISTERED state 500, the UE 100 may not be registered with the network. The UE 100 context in AMF 155 may not hold valid location or routing information for the UE 100 so the UE 100 is not reachable by the AMF 155. Some UE 100 context may still be stored in the UE 100 and the AMF 155. In the RM REGISTERED state 510, the UE 100 may be registered with the network. In the RM-REGISTERED 510 state, the UE 100 may receive services that require registration with the network.

In an example embodiment, two RM states may be employed in AMF 155 for a UE 100 that reflect the registration status of the UE 100 in the selected PLMN: RM-DEREGISTERED 520, and RM-REGISTERED 530.

Figure 6:
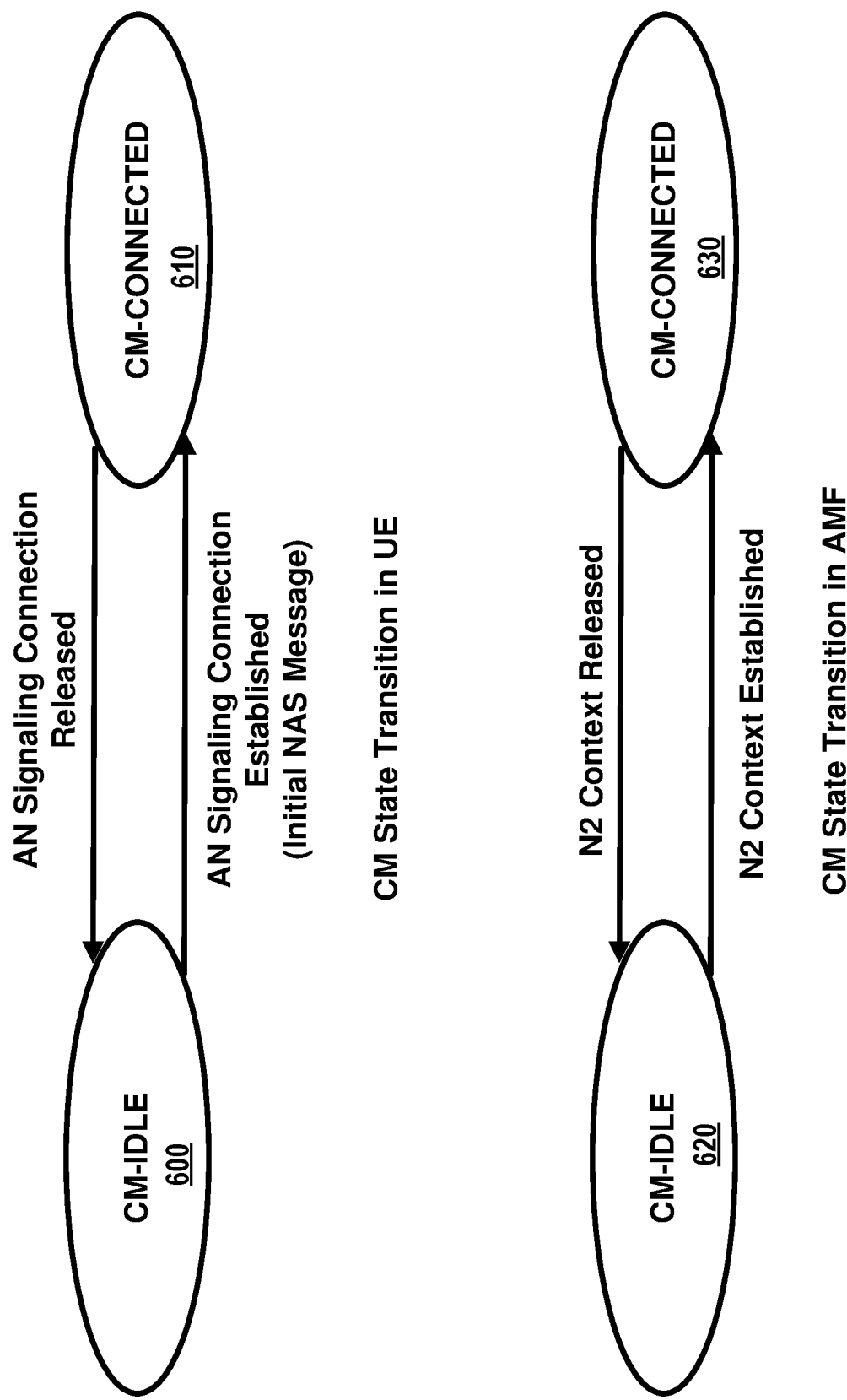
FIG. 6 depicts two connection management state models in UE 100 and AMF 155 as per an aspect of an embodiment.

As shown in example FIG. 6, connection management, CM, may comprise the functions of establishing and releasing a signaling connection between a UE 100 and the AMF 155 over N1. This signaling connection may be employed to enable NAS signaling exchange between the UE 100 and a core network. It comprises both the AN signaling connection between the UE 100 and the (R)AN 105 (e.g. RRC connection over 3GPP access) and the N2 connection for this UE 100 between the AN and the AMF 155.

As depicted in example FIG. 6, two CM states may be employed for the NAS signaling connectivity of the UE 100 with the AMF 155, CM-IDLE 600, 620 and CM-CONNECTED 610, 630. A UE 100 in CM-IDLE 600 state is in RM-REGISTERED 510 state and has no NAS signaling connection established with the AMF 155 over N1. The UE 100 may perform cell selection, cell reselection and PLMN selection. A UE 100 in CM-CONNECTED 610 state has a NAS signaling connection with the AMF 155 over N1.

In an example embodiment two CM states may be employed for a UE 100 at the AMF 155, CM-IDLE 620 and CM-CONNECTED 630.

RRC inactive state may apply to NG-RAN (e.g. it applies to NR and E-UTRA connected to 5G CN). The AMF 155, based on network configuration, may provide assistance information to the NG RAN 105, to assist the NG RAN's 105 decision whether the UE 100 is sent to RRC inactive state. When a UE 100 is CM-CONNECTED 610 with RRC inactive state, the UE 100 may resume the RRC connection due to uplink data pending; Mobile initiated signaling procedure; As a response to RAN 105 paging; Notifying the network that it has left the RAN 105 notification area.

NAS signaling connection management may include the functions of establishing and releasing a NAS signaling connection. NAS signaling connection establishment function may be provided by the UE 100 and the AMF 155 to establish a NAS signaling connection for a UE 100 in CM-IDLE 600 state. The procedure of releasing a NAS signaling connection may be initiated by the 5G (R)AN 105 node or the AMF 155.

Reachability management of UE 100 may detect whether a UE 100 is reachable and providing UE 100 location (e.g. access node) for the network to reach the UE 100. This may be done by paging UE 100 and UE 100 location tracking. The UE 100 location tracking may include both UE 100 registration area tracking and UE 100 reachability tracking. Such functionalities may be either located at 5GC (in case of CM-IDLE 620 state) or NG-RAN 105 (in case of CM-CONNECTED 630 state). The UE 100 and the AMF 155 may negotiate UE 100 reachability characteristics in CM-IDLE 600, 620 state during registration and registration update procedures.

Two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between a UE 100 and a data network identified by a DNN. The PDU connectivity service may be supported via PDU sessions that are established upon request from the UE 100.

A PDU session may support one or more PDU session types. PDU sessions may be established (e.g. upon UE 100 request), modified (e.g. upon UE 100 and 5GC request) and released (e.g. upon UE 100 and 5GC request) using NAS SM signaling exchanged over N1 between the UE 100 and the SMF 160. Upon request from an application server, the 5GC may be able to trigger a specific application in the UE 100. When receiving that trigger message, the UE 100 may pass it to the identified application in the UE 100. The identified application in the UE 100 may establish a PDU session to a specific DNN.

Figure 7:
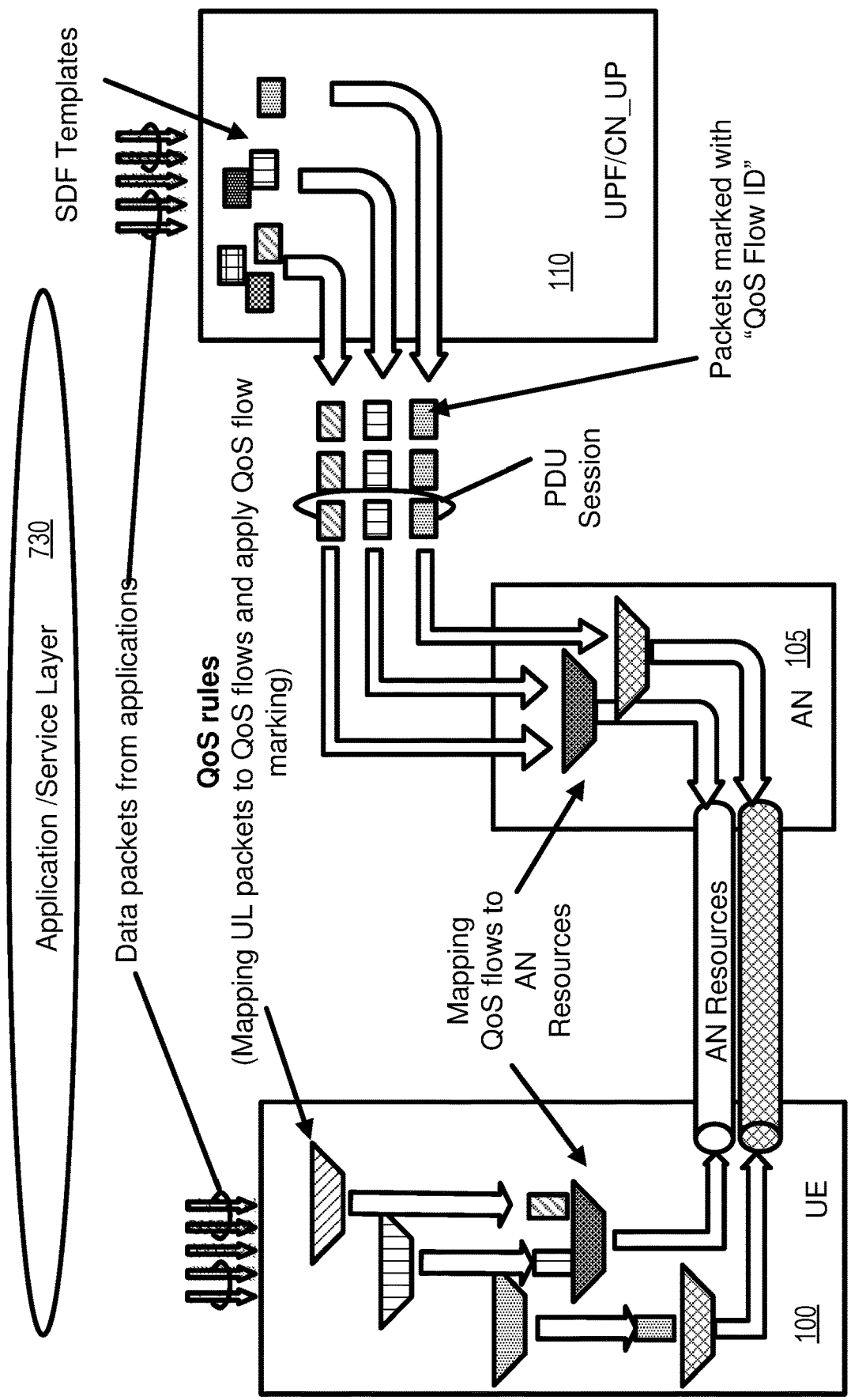
FIG. 7 is diagram for classification and marking traffic as per an aspect of an embodiment.

The 5G QoS model may support a QoS flow based framework as shown in example FIG. 7. The 5G QoS model may support both QoS flows that require a guaranteed flow bit rate and QoS flows that may not require a guaranteed flow bit rate. The 5G QoS model may also support reflective QoS. The QoS model may comprise flow mapping or packet marking at the UPF (CN_UP) 110, AN 105 and/or UE 100. Packets may arrive from and/or destined to the application/service layer 730 of UE 100, UPF (CN_UP) 110, and/or the AF 145.

QoS flow may be a granularity of QoS differentiation in a PDU session. A QoS Flow ID, QFI, may be employed to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. It may be applied to PDUs with different types of payload. The QFI may be unique within a PDU session.

The QoS parameters of a QoS flow may be provided to the (R)AN as a QoS profile over N2 at PDU session or at QoS flow establishment and when NG-RAN is used at every time the user plane is activated. A default QoS rule may be required for every PDU session. The SMF 160 may allocate the QFI for a QoS flow and may derive its QoS parameters from the information provided by the PCF. When applicable, the SMF 160 may provide the QFI together with the QoS profile containing the QoS parameters of a QoS flow to the (R)AN 105.

5G QoS flow may be a granularity for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow.

A 5G QoS indicator may be a scalar that is employed as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like.).

5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. This may be based on the UE's 100 subscription data, UE 100 location, the information from application function AF 145, policy or other related traffic rules. The 5G core network may expose network information and capabilities to an edge computing application function. The functionality support for edge computing may include local routing where the 5G core network may select UPF 110 to route the user traffic to the local data network, traffic steering where the 5G core network selects the traffic to be routed to the applications in the local data network, session and service continuity to enable UE 100 and application mobility, user plane selection and reselection, e.g. based on input from application function, network capability exposure where 5G core network and application function may provide information to each other via NEF, QoS and charging where PCF may provide rules for QoS control and charging for the traffic routed to the local data network, support of local area data network where 5G core network may provide support to connect to the LADN in a certain area where the applications are deployed.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

PDU connectivity service may provide exchange of PDUs between a UE 100 and a data network. PDU session may be an association between a UE 100 and a data network, DN, that provides a PDU connectivity service. The type of association may be IP, or Ethernet or unstructured.

Establishment of user plane connectivity to a data network via a network slice instance(s) may comprise multiple actions. Performing a RM procedure to select an AMF 155 that supports the required network slices, and establishing one or more PDU session(s) to the required data network via the network slice instance(s).

The set of network slices for a UE 100 may be changed at any time while the UE 100 is registered with a network, and may be initiated by the network, or the UE 100.

A periodic registration update may be UE 100 re-registration at expiry of a periodic registration timer. A requested NSSAI is a NSSAI that the UE 100 may provide to the network. A service based interface may represent how a set of services is provided/exposed by a given NF.

A service continuity may be an uninterrupted user experience of a service, including the cases where the IP address and/or anchoring point change. A session continuity may refer to continuity of a PDU session. For PDU session of IP type session continuity may imply that the IP address is preserved for the lifetime of the PDU session. An uplink classifier may be a UPF functionality that aims at diverting uplink traffic, based on filter rules provided by SMF, towards data network.

The 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

A 5G system may reduce dependencies between the access network (AN) and the core network (CN). The architecture may comprise a converged access-agnostic core network with a common AN-CN interface which integrates different 3GPP and non-3GPP access types.

A 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

An example 5G architecture may be service-based and interactions between network functions may be implemented, for example, as shown in example FIG. 1 and FIG. 2. FIG. 1 is an example service-based representation, where network functions within the control plane may enable other authorized network functions to access their services. This representation may also include point-to-point reference points where necessary. FIG. 2 is an example reference point representation, showing the interaction between the NF services in the network functions described by point-to-point reference point (e.g. N11) between any two network functions.

5G and future generation wireless technologies introduce new challenges for signaling procedures that may require different and more complex signaling procedures than legacy 4G networks. The control plane, IP address assignment and user plane in 5G requires a different set of signaling procedures and that cannot be resolved by implementing legacy 4G signaling mechanisms. In an example 5G network, AMF may be relocated during registration or an ongoing connection, and a new AMF may be selected. In an example network architecture, the new AMF may select a new SMF, which may cause SMF relocation. The new SMF may select a new UPF, which may cause UPF relocation. In an example, AMF relocation, RAN relocation or other network element causes may result in AMF, SMF, and UPF relocation. Implementation of legacy 5G signaling mechanism may not support relocation of SMF, AMF and UPF during a signaling procedure. In such a scenario, implementation of legacy 5G signaling mechanism may result in dropping a registration request procedure, an ongoing connection or an ongoing session. There is a need to implement enhanced signaling procedures in a wireless core/access network to improve quality, user experience and performance of registration procedures, ongoing connections and an ongoing sessions when there is a need to relocate AMF, SMF and UPF.

Example embodiments implement enhanced signaling mechanisms to re-locate AMF, SMF and UPF during registration procedures, ongoing connection or an ongoing session. Implementation of enhanced signaling mechanisms require implementation of additional messages, message formats and/or procedures. Example embodiments improve users experience and call quality by enhancing signaling procedures resulting in reducing call dropping. In an example, AMF, SMF and UPF may be relocated during a registration process. In an example, AMF, SMF, and UPF may be relocated during a handover procedure. Handover may be initiated by RAN due to UE mobility, traffic offloading, and other factors. In an example, AMF relocation may be initiated by 5G core to provide additional services or functions.

In an example, when an SMF is relocated, the new SMF may allocate a different IP address to the UE and establish one or more new PDU sessions. In an example, the new SMF may maintain the old SMF or an anchor SMF during and after SMF relocation. Depending on network architecture and scenarios various implementations are possible during AMF, SMF and UPF relocation.

The PDU session information and/or user plane session information may comprise various information elements. For example, a PDU session ID: a PDU session ID may be an identifier to identify a PDU session. For example, CN N3 Tunnel Info: The tunnel between (R)AN and UPF may be an N3 tunnel, and the tunnel may be used for the user data transmission. CN N3 Tunnel Info may be the N3 tunnel information from CN side, which may comprise the UPF address (e.g. IP address or FQDN) or identity, and/or tunnel endpoint identifier (e.g. TEID). The CN N3 Tunnel Info may be used by (R)AN for the uplink data forwarding. For example, (R)AN N3 Tunnel Info: (R)AN N3 Tunnel Info may be the N3 tunnel information from (R)AN side, which may comprise the (R)AN address or identity, and/or tunnel endpoint identifier (e.g. TEID). The (R)AN N3 Tunnel Info may be used by the CN (e.g. UPF) for downlink data forwarding. For example, SMF address or identifier: The address of SMF may be an IP address or FQDN). For example, UE IPv4 address and/or IPv6 prefix. For example, a Data Network Name (DNN).

The PCF may have stored the PDU session information for a PDU session identified by a PDU session ID, however, after the SMF relocation, it is unclear how the PCF updates the PDU session information, considering: the UE IPv4 address and/or IPv6 prefix, the SMF address or identifier and/or CN N3 Tunnel Info may be changed for the same PDU session ID.

In the registration procedure of 3GPP TS 23.502, it is specified that "Based on the PDU session status provided by the new AMF checks the PDU session status and in the Namf_EventExposure_Notify service operation the SMF either re-activates the PDU sessions by executing actions 4 to 12 specified in clause 4.2.3.2 to complete the User Plane(s) setup without sending MM NAS Service Accept from the AMF to (R)AN described in action 9 of clause 4.2.3.2 or releases any network resources related to PDU sessions that the UE indicated as not established." However, the user plane N3 tunnel may not work properly, because "without sending MM NAS Service Accept from the AMF to (R)AN," information of the tunnel between (R)AN and UPF may not be known by (R)AN and/or UPF.

Example 1

Figure 9A:
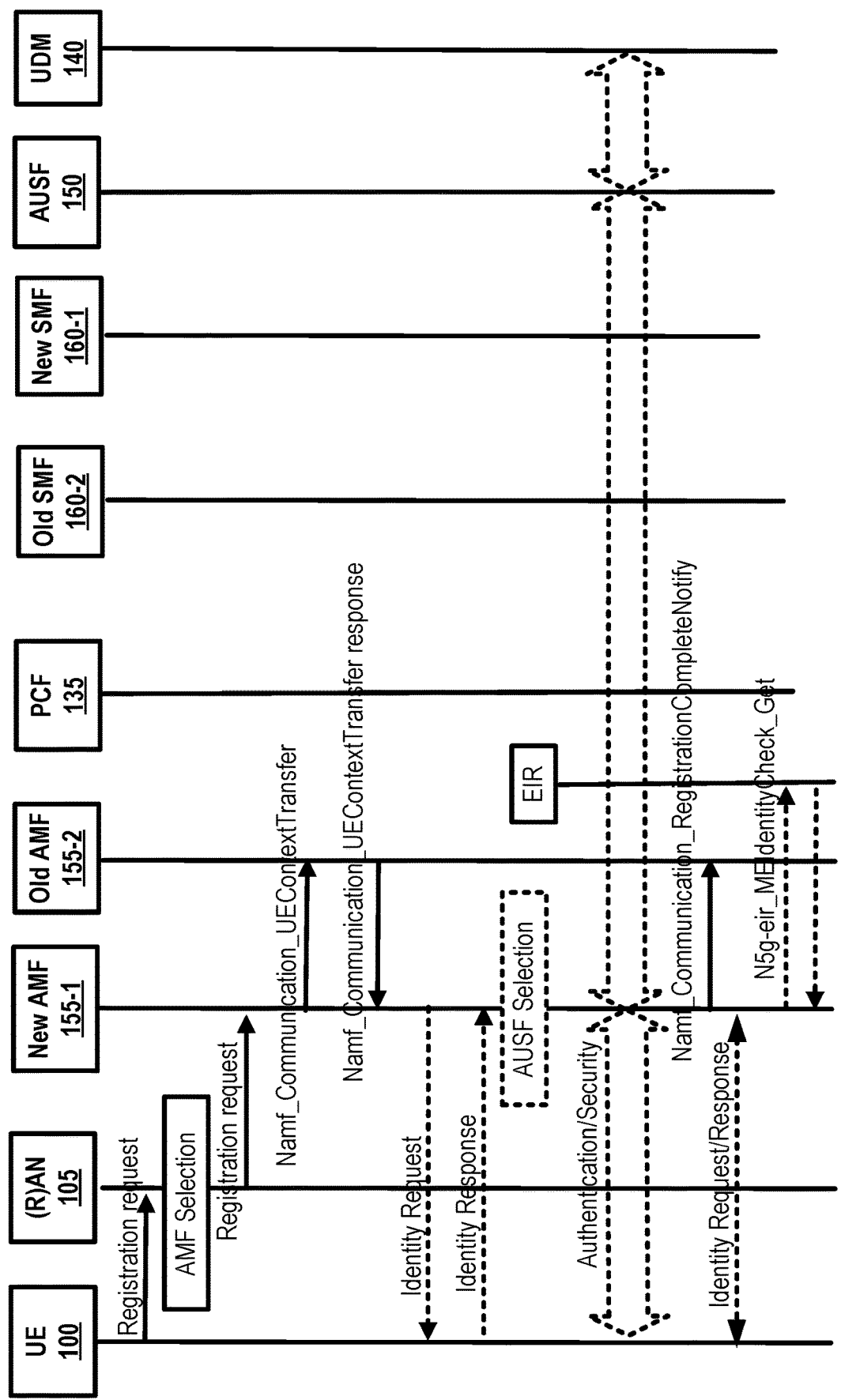
FIG. 9A and FIG. 9B are example call flow diagrams as per an aspect of an embodiment of the present invention.
Figure 9B:
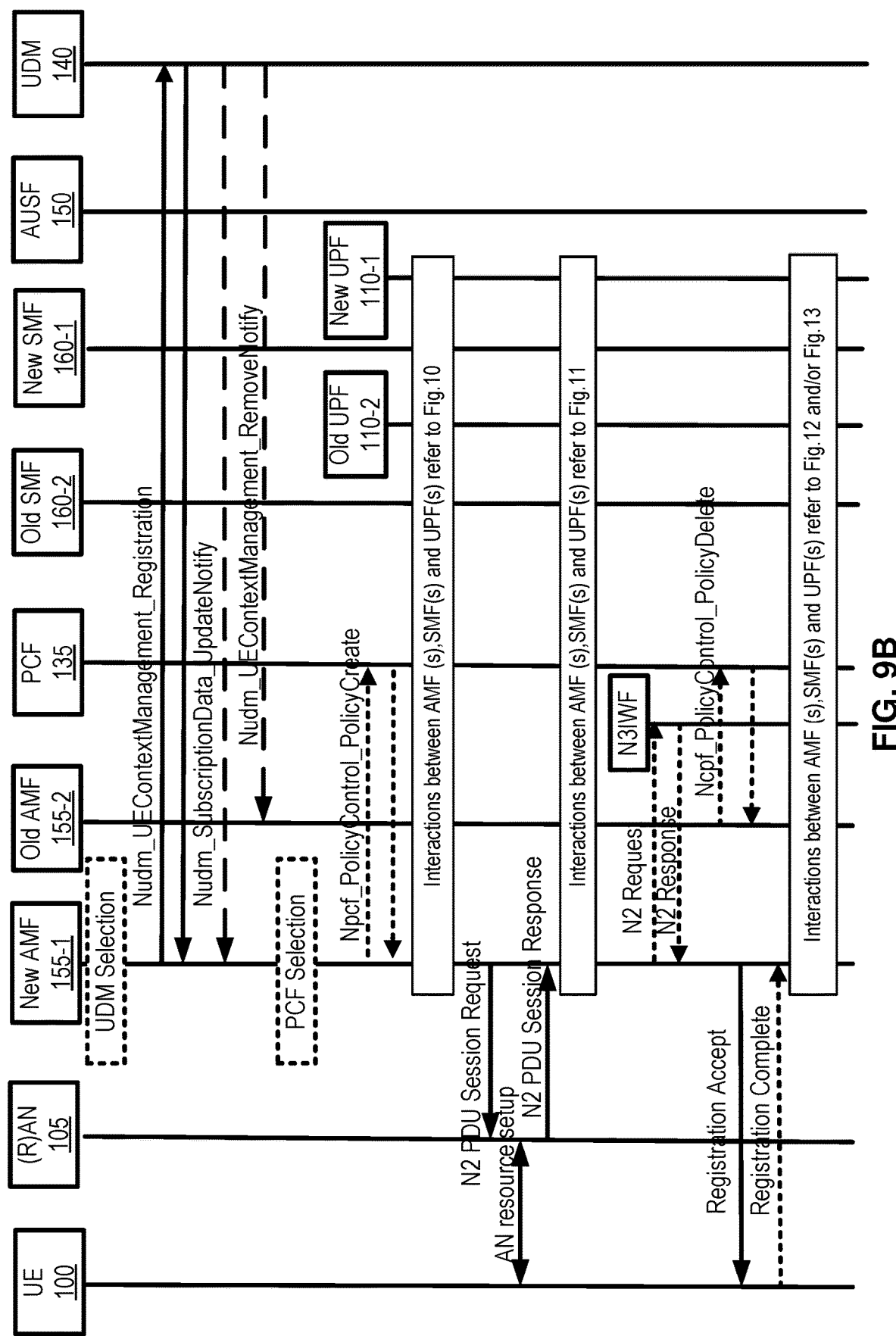

In an example, the UE may be in a CM-IDLE state and may perform a registration procedure where both AMF and SMF may be relocated. FIG. 9A and FIG. 9B show an example call flow. UE 100 may send a registration request to a (R)AN 105. The registration request may comprise an AN message (AN parameters, RM-NAS Registration Request (Registration type, SUPI or 5G-GUTI, Security parameters, NSSAI, UE 5GCN Capability, PDU session status, PDU session(s) to be re-activated, Follow on request, and MICO mode preference)). If a SUPI is included or the 5G-GUTI does not indicate a valid AMF, the (R)AN 105, (based on (R)AT and NSSAI, if available), may select an AMF. In this example, a new AMF 155-1 may be selected.

(R)AN 105 may send the New AMF 155-1 a message (e.g. registration request). The message may comprise one or more of the following: N2 parameters, RM-NAS Registration Request (Registration type, Subscriber Permanent Identifier or 5G-GUTI, Security parameters, NSSAI and MICO mode preference), and/or the like. If the UE's 5G-GUTI was included in the registration request and the serving AMF 155-2 has changed since last registration, the new AMF 155-1 may invoke a service operation (for example Namf_Communication_UEContextTransfer) on the old AMF 155-2. The service request may comprise a Registration Request IE, which may be integrity protected, to request the UE's SUPI and MM Context.

The Old AMF 155-2 may respond to the New AMF 155-1, for example, with a Namf_Communication_UEContext-Transfer response comprising the UE's SUPI and MM Context. If the Old AMF 155-2 holds information about active PDU Sessions, the response message Old AMF 155-2 may comprise information about the existing PDU session(s) which may be already be established. In this case, the response message may comprise, for example: SMF information (e.g. SMF identities or SMF address); UPF information (e.g. UPF identities or UPF address); PDU session ID(s); UE IPv4 Address and/or IPv6 prefix if available; DNN (if available); and/or the like.

PDU sessions may have various names to differentiate an existing PDU session and a newly created or established PDU session. For example, an existing PDU session may be named as an old PDU session or a second PDU session, and a new PDU session may be named as a PDU session or a first PDU session. The second PDU session may be associated with the first PDU session for the same wireless device.

If the SUPI is not provided by the UE 100 nor retrieved from the Old AMF 155-2, the identity request procedure may be initiated by the New AMF 155-1 by sending an Identity Request message to the UE 100. The UE 100 may respond with an identity response message to the New AMF 155-1 comprising the SUPI. The AMF 155-1 may decide to invoke an AUSF. The AUSF 150 may initiate an authentication of the UE 100. The New AMF 155-1 may initiate NAS security functions. The New AMF 155-1 may notify the Old AMF 155-2 that the registration of the UE in the New AMF 155-1 is completed by invoking, for example, the Namf_Communication_RegistrationCompleteNotify service operation. If the PEI was not provided by the UE 100 nor retrieved from the Old AMF 155-2, the identity request procedure may be initiated by AMF 155-1 by, for example, sending an identity request message to the UE 100 to retrieve the PEI. The New AMF 155-1 may initiate an ME identity check by invoking, for example, an N5g-eir_ME-IdentityCheck_Get service operation.

In an example, the New AMF 155-1 may select a UDM 140 based on the SUPI. If the AMF has changed since the last registration, or if the UE provides a SUPI which doesn't refer to a valid context in the AMF, or if the UE registers to the same AMF it has already registered to a non-3GPP access (i.e. the UE is registered over a non-3GPP access and initiates this registration procedure to add a 3GPP access), the New AMF 155-1 may invoke, for example, a Nudm_UEContextManagement_Registration service operation towards the UDM 140. If there is no subscription context for the UE in the New AMF 155-1, a "subscription data retrieval indication" may be included. The New AMF 155-1 may provide the access type it serves for the UE to the UDM. The access type may be set to, for example, "3GPP access." The UDM 140 may store the associated access type together with the serving AMF 155-1. If "the subscription data retrieval" indication was included, the UDM 140 may invoke the Nudm_SubscriptionData_UpdateNotification service operation to provide the subscription data from the UDM 140. When the UDM 140 stores the associated access type together with the serving AMF 155-1, it may cause the UDM to initiate a notification (for example, a Nudm_UE-ContextManagement_RemoveNotification) to the Old AMF 155-2 corresponding to 3GPP access, if one exists. The Old AMF 155-2 may remove the MM context of the UE 100.

The New AMF 155-1 may select a PCF based, for example: the SUPI, an IPv4 Address and/or IPv6 prefix of the existing PDU session(s) if available, a DNN, and/or the like. If the New AMF 155-1 has not yet obtained an Access and Mobility policy for the UE 100 or if the Access and Mobility policy in the New AMF 155-1 may be no longer valid, the New AMF 155-1 may request the PCF 135 to apply operator policies for the UE 100 by creating a policy control session with the PCF 135 through, for example, a Npcf_PolicyControl_PolicyCreate service operation. The PCF 135 may respond to the Npcf_PolicyControl_PolicyCreate service operation and provide the Access and Mobility policy data for the UE 100 to the New AMF 155-1. The new AMF may decide to select a new SMF which is different from the old SMF based on, for example: a selected Data Network Name (DNN); S-NSSAI; Subscription information from UDM; local operator policies; load conditions of the candidate SMFs; and/or the like.

Figure 10:
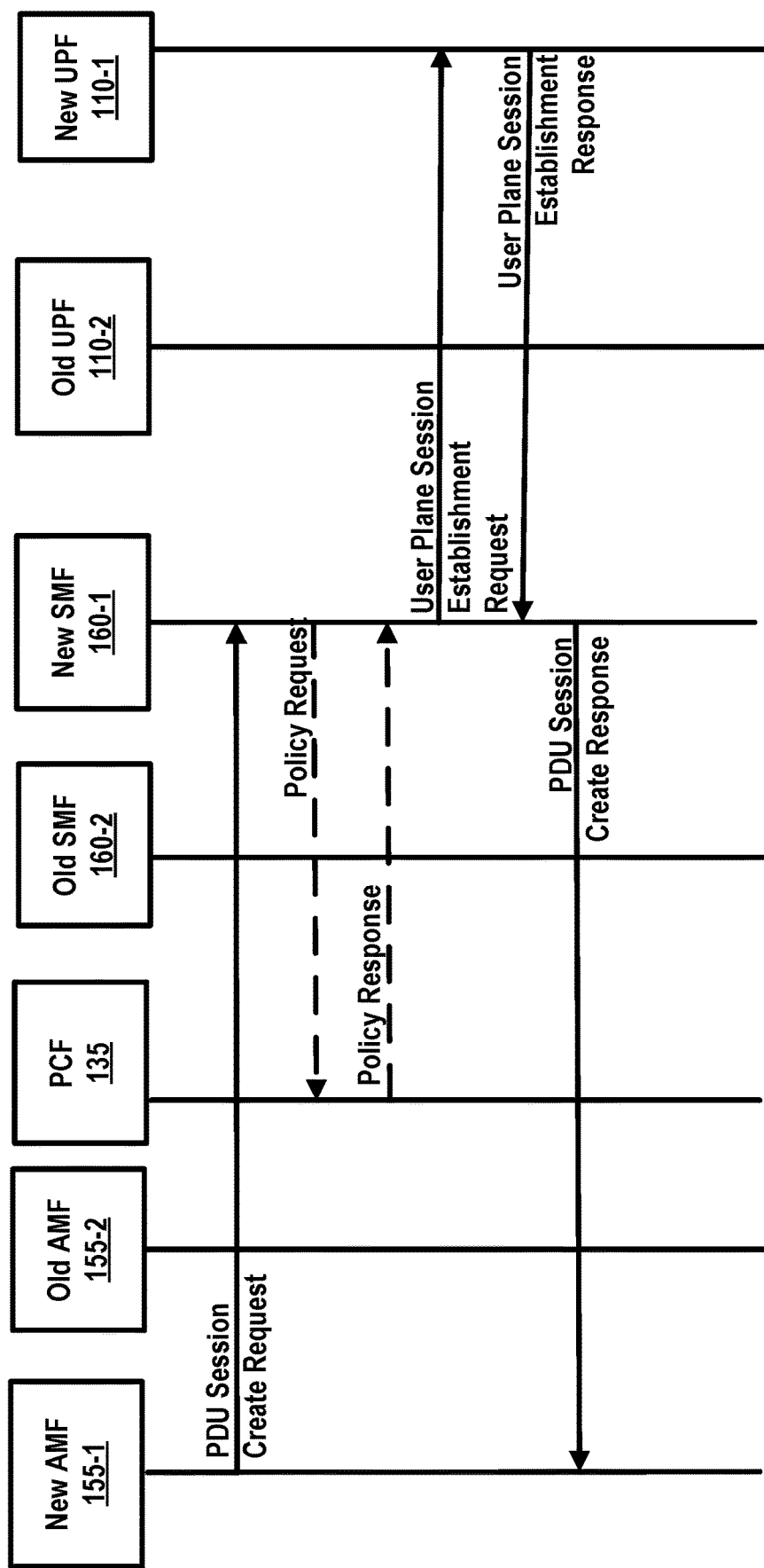
FIG. 10 is an example call flow diagram as per an aspect of an embodiment of the present invention.

Example interactions between AMF(s), SMF(s) and UPF(s) to create PDU session(s) are illustrated in FIG. 10. As another alternative, an old AMF may also be named as a source AMF, an old SMF may be named as a source SMF, a new AMF may be named as a target AMF, and a new SMF may be named as a target SMF.

In response to the message received from actions of FIG. 10, the new AMF 155-1 may send a NAS message to (R)AN 105. The NAS message may comprise information, such as, for example: UE IPv4 and/or IPv6 prefix to the PDU session(s) if the PDU Type is IPv4 and/or IPv6; PDU Session ID(s); CN N3 tunnel info (e.g. New UPF 110-1 address or identity, and TEID) for the PDU session(s); PDU Session Establishment Accept targeted to the UE; and/or the like.

(R)AN 105 may issue AN specific signaling exchange with the UE that is related with the information received from SMF. For example, in case of a 3GPP RAN, an RRC Connection Reconfiguration may take place with the UE establishing the necessary RAN resources related to the Authorized QoS Rules for the PDU Session(s). For example, the (R)AN 105 may also allocate (R)AN N3 tunnel information comprising (R)AN address or identify and/or tunnel end identifier (TEID) of N3 tunnel for downlink for the PDU session(s), and/or correlate the (R)AN N3 tunnel with the CN N3 tunnel for the PDU session(s). For example, (R)AN 105 may forward the NAS message (PDU Session ID(s), N1 SM information (PDU Session Establishment Accept)) received from the new AMF 155-1 to the UE. (R)AN may provide the NAS message to the UE if the necessary RAN resources may be established and the allocation of (R)AN tunnel information may be successful. (R)AN 105 may send a message to the New AMF 155-1: N2 PDU Session Response (PDU Session ID(s), Cause, N2 SM information (PDU Session ID(s), (R)AN N3 tunnel information, list of accepted/rejected QoS profile(s))).

In response to the information received from (R)AN 105, the (R)AN N3 Tunnel information may be sent to the New UPF 110-1 by the interactions between AMF(s), SMF(s) and UPF(s). Such interactions to modify PDU session(s) may be further detailed in example FIG. 11. As an alternative, one or more actions in example FIG. 12 may be performed.

The New AMF 155-1 may decide to modify the N2AP UE-TNLA-binding toward N3IWF by sending a N2 request message. The N3IWF may response with a N2 response message. If the Old AMF 155-2 previously requested a UE context to be established in the PCF 135, the Old AMF 155-2 may terminate the UE context in the PCF 135 by invoking, for example, the Npcf_PolicyControl_PolicyDelete service operation. The New AMF 155-1 may send a registration accept message to the UE 100 indicating that the registration has been accepted. The 5G-GUTI may be included if the New AMF 155-1 allocates a new 5G-GUTI.

If a new 5G-GUTI was assigned, the UE 100 may send a registration complete message to the New AMF 155-1 as an acknowledgment. As an alternative, one or more actions, such as illustrated in example FIG. 11 may be performed.

Figure 12:
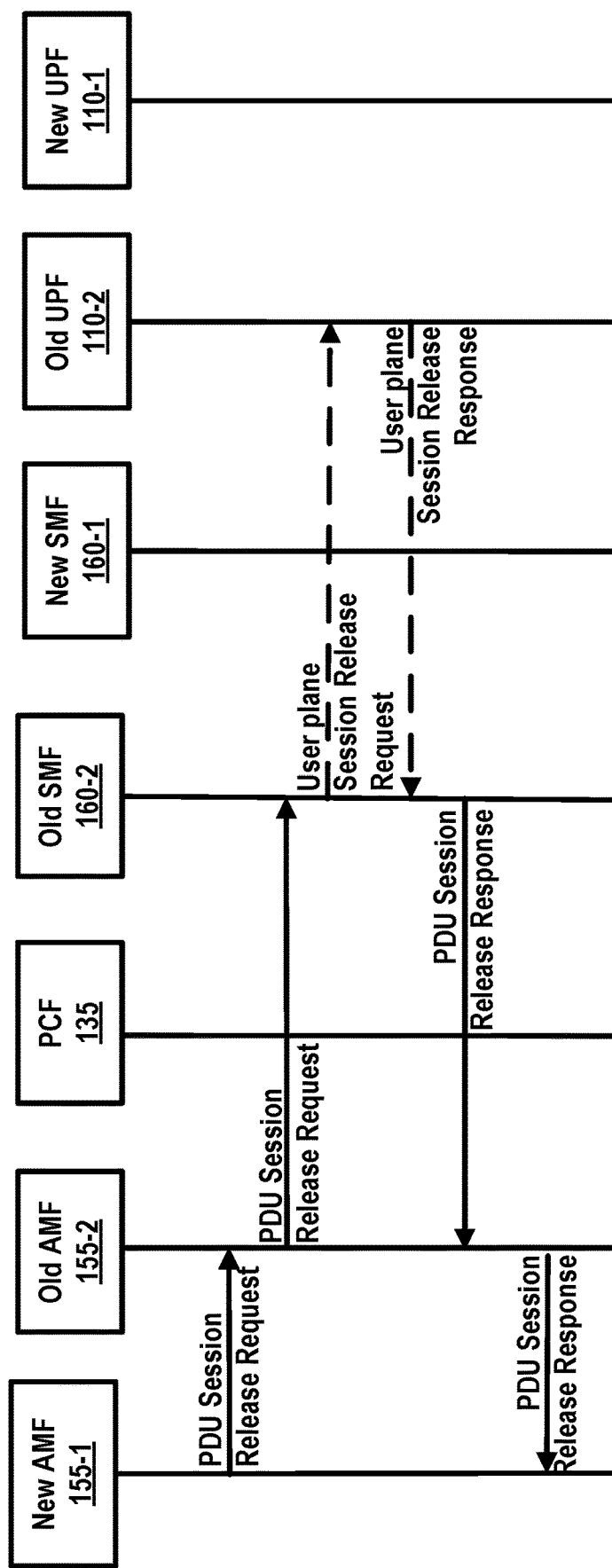
FIG. 12 is an example call flow diagram as per an aspect of an embodiment of the present invention.

The interactions between AMF(s), SMF(s) and UPF(s) to delete PDU session(s) may be further detailed in example FIG. 12 comprising one or more actions.

In an example, a new AMF may receive from an old AMF, a first message indicating a handover of a wireless device. The first message may comprise one or more first parameters of an old SMF. This provides the information of the old SMF to the new AMF. This information enables the new AMF to determine whether the old SMF can provide the required services or not. This enhance process provides information to the new AMF to effectively select a proper SMF for the call. FIG. 10 is an example call flow diagram as per an aspect of an embodiment of the present invention. As illustrated, the New AMF 155-1 may select a new SMF different from the old SMF. In some scenarios, the old SMF may not be able to provide the required services during AMF relocation. In some network scenarios, the new AMF may be connected to a new SMF different from the old SMF and the new SMF selection may enable the new AMF to maintain existing services and connection. The new AMF may send a message to the New SMF 160-1, (e.g. PDU session create request) to request establishing/creating one or more PDU sessions in one or more of the following example conditions: A) the UE intends to activate one or more existing PDU sessions which have already been established; B) the UE intends to establish one or more new PDU sessions; C) based on the local policy, the New AMF 155-1 intends to establish one or more new PDU sessions; D) other reasons to activate existing PDU session and/or establish one or more new PDU sessions; and/or the like. The message may comprise at least one PDU session identifier of the one or more PDU sessions. This enhanced signaling procedure enables the new SMF to create the one or more PDU sessions to maintain session continuity during AMF, SMF, and UPF relocation.

Example cases A and D may be used to activate one or more existing PDU sessions (which have already been established before), as such PDU session(s) that may have been established with an old SMF before the SMF relocation. In these cases, one or more new PDU sessions may be established with the New SMF, and the related old PDU session(s) (e.g. the old PDU session(s) which have the same PDU session ID(s) with the new PDU session(s)) may be released after the new PDU session(s) have been established. Example cases B and C may be used to establish one or more new PDU sessions. In these cases, the old PDU session(s) may also be released after the new PDU session(s) have been established.

The message (e.g. PDU session create request) sent by the New AMF 155-1 to the New SMF 160-1 may comprise one or more of the following information elements. For example, the session create request message may comprise an S-NSSAI and/or a network slicing instance ID. The S-NSSAI may comprise a Slice/Service type (SST) and a Slice Differentiator (SD) which may indicate expected network slice behavior in terms of features and services. The network slicing instance ID may identify a network slicing instance. For example, the session create request message may comprise PDU Session ID(s) for one or more PDU sessions. The PDU Session ID may identify a PDU session. For example, the session create request message may comprise a user identity of the wireless device. The user identity of the wireless device may be the UE IPv4 address and/or IPv6 prefix for the existing PDU session(s), the UE NAI and/or Subscriber Permanent Identifier (SUPI), and/or the like. For example, the session create request message may comprise a Data Network Name (DNN). The DNN may be equivalent to an APN, which may be used to select N6 interface(s) for a PDU session, and/or determine the policies and apply the policies to the PDU session. For example, the session create request message may comprise UPF information (e.g. UPF identities or UPF address).

In response to the message from the New AMF 155-1, the New SMF 160-1 may take one or more actions. An example action may comprise allocating a UE IPv4 and/or IPv6 prefix to the PDU session(s) if the PDU Type is IPv4 and/or IPv6. An example action may comprise allocating an IPv6 prefix for the PDU session(s) and N6 point-to-point tunneling if the PDU Type is Ethernet PDU and/or Unstructured PDU. The N6 tunnel may be used to transmit the user data between the UPF and a Data Network. An example action may comprise allocating the CN N6 tunnel info (e.g. New UPF 110-1 address or identity, and tunnel endpoint identifier (e.g. TEID)) and CN N3 tunnel info (e.g. New UPF 110-1 address or identity, and TEID) for the PDU session(s). An example action may comprise selecting a PCF. The New SMF 160-1 may select the same PCF which has already served existing PDU session(s) identified by PDU session ID. The New SMF 160-1 may select the same PCF based on information such as, for example: the SUPI; UE IPv4 address and/or IPv6 prefix for the existing PDU session(s); DNN; and/or the like. Alternatively, the New SMF 160-1 may select a new PCF. An example action may comprise sending to the PCF 135, a message (e.g. policy request) to request policy(s) for the PDU session(s). The message may comprise one or more of the following information elements, such as, for example: an indication (e.g. handover indication) to indicate that the AMF and/or SMF is relocated; information received from the New AMF 155-1, which may include the UE IPv4 address and/or IPv6 prefix for the existing PDU session(s); new allocated UE IPv4 and/or IPv6 prefix to the PDU session(s) if the PDU Type is IPv4 and/or IPv6; and the IPv6 prefix for the PDU session(s) and N6 point-to-point tunneling if the PDU Type is Ethernet PDU and/or Unstructured PDU.

The IP address may have various names to differentiate the UE IPv4 address and/or IPv6 prefix for the existing PDU session and the new allocated UE IPv4 and/or IPv6 prefix for the new PDU session. For example, a UE IP address comprising an IPv4 address and/or IPv6 prefix for an existing PDU session may be named as a second IP address, and a new allocated UE IP address comprising a UE IPv4 and/or IPv6 prefix for a new PDU session may be named as a first IP address.

The PCF 135 may take one or more actions. An example PCF 135 action may comprise making a policy decision based on the information received from the New SMF 160-1 and/or other information (e.g. subscription information). An example PCF 135 action may comprise, if the same PCF is selected by the New SMF 160-1, the PCF 135 updating the PDU session context for each of the PDU session ID by replacing the stored PDU session information with the new received information (e.g. replacing UE IPv4 address and/or IPv6 prefix of the existing PDU session with the new allocated UE IPv4 and/or IPv6 prefix to the PDU session; and replacing the address or identity of Old SMF 160-2 with the address or identity of the New SMF 160-1). An example PCF 135 action may comprise, if the same PCF is selected by the New SMF 160-1, the PCF 135 creating a new PDU session context for each of the PDU session ID comprising the PDU session ID. The new allocated UE IPv4 and/or IPv6 prefix to the PDU session(s), the address or identity of the New SMF 160-1, the SUPI, and/or DNN; and mark the existing PDU session context for the same PDU session ID as inactive. The PCF may release the existing PDU session context at this action or in the later action. An example PCF 135 action may comprise the PCF 135 sending to the New SMF 160-1, a message (e.g. policy response) by providing one or more of the following policies(s): QoS policy for the PDU session(s); charging policy for the PDU session(s); traffic Steering Control for steering traffic; and other policies.

Based on the existing UPF information (e.g. UPF identities or UPF address) received from the New AMF 155-1 and the policy received from the PCF 135, the New SMF 160-1 may select a new UPF 110-1. In some scenarios, the old UPF may not be able to provide the required services during SMF relocation. In some network scenarios, the new SMF may be connected to a new UPF different from the old UPF and the new UPF selection may enable the new SMF to maintain existing services and connection.

The New SMF 160-1 may send a message to the New UPF 110-1 (e.g. user plane session establishment request) to request establishing user plan session(s) for the PDU session(s) comprising one or more of the following information: An indication (e.g. handover indication) to indicate that the AMF and/or SMF is relocated; The S-NSSAI and/or the network slicing instance ID; The PDU session ID(s); The user identity of the wireless device; The Data Network Name (DNN); The CN N6 tunnel info (e.g. New UPF 110-1 address or identity, and TEID) and CN N3 tunnel info (e.g. New UPF 110-1 address or identity, and TEID) for the PDU session(s) if the corresponding tunnel info is allocated by the SMF, and the policies for the PDU sessions. This enhanced signaling procedure enables the new SMF to create the one or more PDU sessions to maintain session continuity during AMF, SMF, and UPF relocation. This enhanced signaling procedure enables the new UPF to create at least one user plane session for one or more PDU sessions to maintain session continuity during AMF, SMF, and UPF relocation.

UPF may have various names to differentiate an existing UPF and a new UPF, an existing UPF may be named as a source UPF and a new UPF may be named as target UPF.

Based on the message received from the New SMF 160-1, the New UPF 110-1 may take one or more of the following actions: The New UPF 110-1 may set up the user plane session(s), and/or acknowledge the New SMF 160-1. The New UPF 110-1 may create a new user plane session context for each of PDU session ID comprising one or more elements of the message received from the New SMF 160-1 and the address or identity of the New SMF 160-1. The New UPF 110-1 may acknowledge the New SMF 160-1 by sending a response message (e.g. user plane session establishment response), the New UPF 110-1 may include in the response message the CN N6 tunnel info (e.g. New UPF 110-1 address or identity, and TEID) and CN N3 tunnel info (e.g. New UPF 110-1 address or identity, and TEID) for the PDU session(s) if the corresponding tunnel info is allocated by the UPF.

The New SMF 160-1 may acknowledge the New AMF 155-1 by sending a response message (e.g. PDU session create response). The New SMF 160-1 may include one or more of the following information in the response message: UE IPv4 and/or IPv6 prefix to the PDU session(s) if the PDU Type is IPv4 and/or IPv6; The allowed S-NSSAI and/or the network slicing instance ID; The PDU session ID(s); The user identity of the wireless device; The Data Network Name (DNN); The CN N3 tunnel info (e.g. New UPF 110-1 address or identity, and TEID) for the PDU session(s); and The policies for the PDU sessions.

Figure 11:
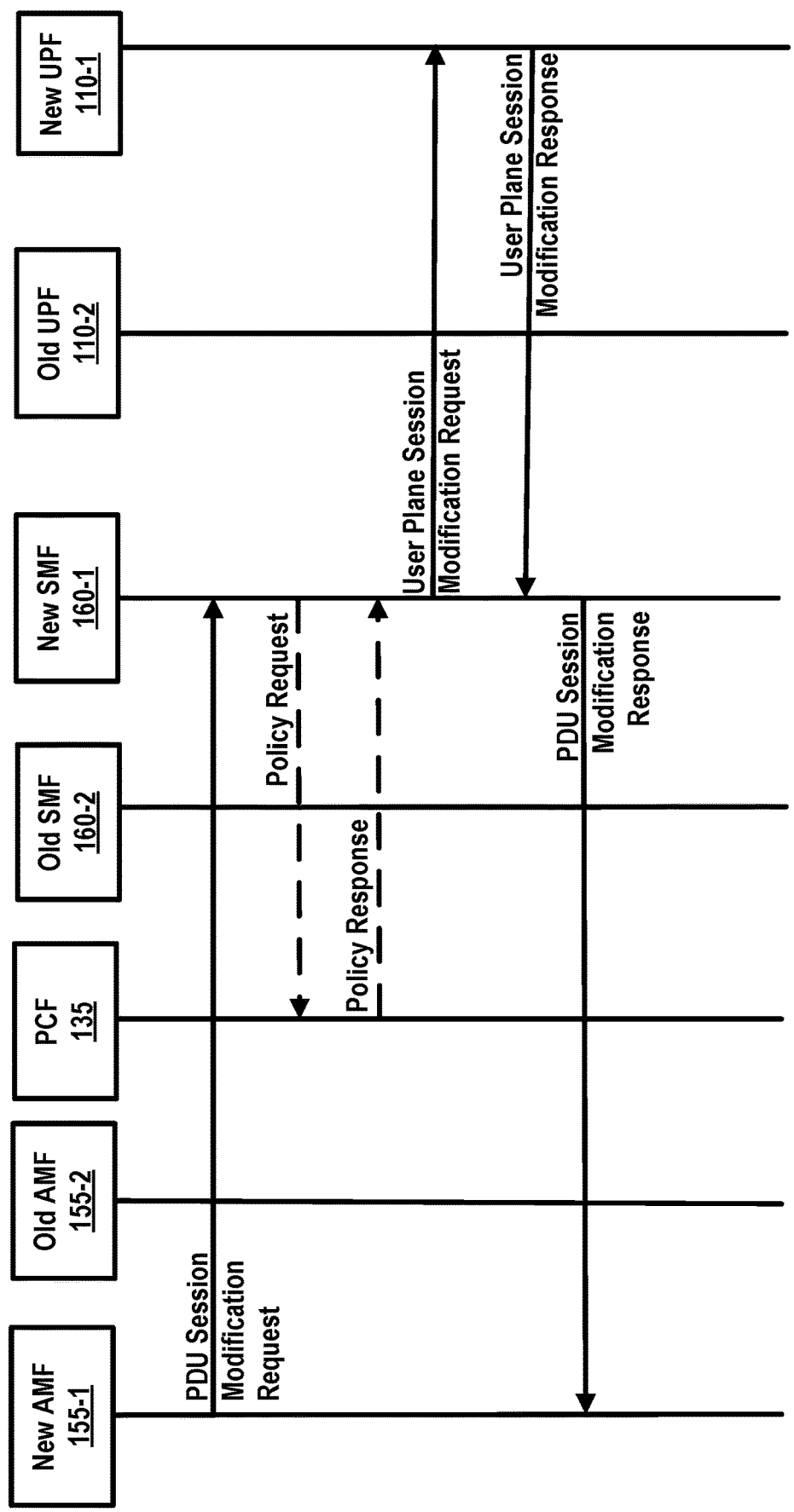
FIG. 11 is an example call flow diagram as per an aspect of an embodiment of the present invention.

FIG. 11 is an example call flow diagram as per an aspect of an embodiment of the present invention. The New AMF 155-1 may send a message to the New SMF 160-1, (e.g. PDU session modification request) to request update one or more PDU sessions with one or more information elements. An information element may comprise the (R)AN N3 tunnel information (e.g. (R)AN address or identify, TEID) for the PDU Session(s). An information element may comprise an S-NSSAI and/or a network slicing instance ID. An information element may comprise PDU Session ID(s) for one or more PDU sessions. An information element may comprise user identity of the wireless device, and an information element may comprise Data Network Name (DNN).

In response to the message received from the AMF 155-1, the New SMF 160-1 may send a message to a PCF 135 (e.g.

policy request) to request policy(s) for the PDU session(s). The message may comprise one or more of the following information elements: The information received from the New AMF 155-1; The UE IPv4 and/or IPv6 prefix to the PDU session(s) if the PDU Type is IPv4 and/or IPv6; and The IPv6 prefix for the PDU session(s) and N6 point-to-point tunneling if the PDU Type is Ethernet PDU and/or Unstructured PDU.

The PCF 135 may make the policy decision based on the information received from the New SMF 160-1 and/or other information (e.g. subscription information), and may response the request to the New SMF 160-1 by providing one or more of the following policy(s): QoS policy for the PDU session(s); charging policy for the PDU session(s); Traffic Steering Control for steering traffic; and other policies.

After receiving the policy(s) from the PCF 135, the New SMF 160-1 may send a message to the New UPF 110-1 (e.g. user plane session modification request) to request update the user plan session(s) for the PDU session(s). The message may comprise one or more of the following information: The (R)AN N3 tunnel information (e.g. (R)AN address or identify, TEID) for the PDU Session(s); the S-NSSAI and/or the network slicing instance ID; The PDU session ID(s); The user identity of the wireless device; The Data Network Name (DNN); The CN N6 tunnel info (e.g. New UPF 110-1 address or identity, and TEID) and CN N3 tunnel info (e.g. New UPF 110-1 address or identity, and TEID) for the PDU session(s); and the policies for the PDU session(s).

The New UPF 110-1 may update the user plane sessions and correlate the CN N3 tunnel with (R)AN N3 tunnel for the PDU session(s) and acknowledges the New SMF 160-1 by sending a response message.

In response to the message received from the New UPF 110-1, the New SMF 160-1 may acknowledge the New AMF 155-1 by sending a response message (e.g. PDU session modification response). The New SMF 160-1 may include one or more the following in the response message: UE IPv4 and/or IPv6 prefix to the PDU session(s) if the PDU Type is IPv4 and/or IPv6; the allowed S-NSSAI and/or the network slicing instance ID; the PDU session ID(s); the user identity of the wireless device; the Data Network Name (DNN); the CN N3 tunnel info (e.g. New UPF 110-1 address or identity, and TEID) for the PDU session(s); and the policies for the PDU session(s).

FIG. 12 is an example call flow diagram as per an aspect of an embodiment of the present invention. The New AMF 155-1 may send a message to the old AMF 155-2 (e.g. PDU session release request) to request releasing one or more PDU sessions. The message may comprise one or more of the following: the S-NSSAI and/or the network slicing instance ID, the PDU session ID(s), user identity of the wireless device, and/or the Data Network Name (DNN). The released the PDU session(s) may be established before the SMF relocation. In response to receiving the PDU session release request message from the New AMF 155-1, the old AMF 155-2 may send a message to the old SMF 160-2 (e.g. PDU session release request) to request releasing one or more PDU sessions comprising the information received from the New AMF 155-1. In response to receiving the PDU session release request message from the old AMF 155-2, the old SMF 160-2 may send a message to the Old UPF 110-2 (e.g. user plane session release request) to request releasing one or more user plane sessions for the PDU session(s) comprising the information received from the old AMF 155-2. This action may be optional. In response to receiving the user plane session release request from the old SMF 160-2, the Old UPF 110-2 may release the corresponding user plane sessions and acknowledge the old SMF 160-2 by sending a response message (e.g. user plane session release response). If the Old UPF 110-2 has already released the corresponding user plane session(s), the Old UPF 110-2 may acknowledge the old SMF 160-2 by sending a response message (e.g. user plane session release response). This action may be optional. The old SMF 160-2 may acknowledge the old AMF 155-2 by sending a response message (e.g. PDU session release response). The old AMF 155-2 may acknowledge the New AMF 155-1 by sending a response message (e.g. PDU session release response), and the New AMF 155-1 may further send message to (R)AN 105 and/or UE 100 to release the related resource. As an example, the Old UPF 110-2 may release the user plane session(s) (s) without the request from the old SMF 160-2.

Example 2

This example is similar to example 1 and may have the following differences: The action(s) of FIG. 12 in example 1 may be replaced by action(s) of FIG. 13 in example 2. An example call flow is illustrated in example FIG. 9A and example FIG. 9B.

In an example, UE 100 may send a registration request to a (R)AN 105. The registration request may comprise an: AN message (AN parameters, RM-NAS Registration Request (Registration type, SUPI or 5G-GUTI, Security parameters, NSSAI, UE 5GCN Capability, PDU session status, PDU session(s) to be re-activated, Follow on request, and MICO mode preference)). If a SUPI is included or the 5G-GUTI does not indicate a valid AMF, the (R)AN 105, (based on (R)AT and NSSAI, if available), may select an AMF. In this example, a new AMF 155-1 may be selected.

(R)AN 105 may send the New AMF 155-1 a message (e.g. registration request). The), the message may comprise one or more of the following information: N2 parameters, RM-NAS Registration Request (Registration type, Subscriber Permanent Identifier or 5G-GUTI, Security parameters, NSSAI and MICO mode preference), and/or the like. If the UE's 5G-GUTI was included in the registration request and the serving AMF 155-2 has changed since last registration, the new AMF 155-1 may invoke a service operation (for example the Namf_Communication_UEContextTransfer) service operation on the old AMF 155-2. The service request may comprise a comprising the complete Registration Request IE, which may be integrity protected, to request the UE's SUPI and MM Context.

The Old AMF 155-2 may respond to the New AMF 155-1, for example, with a Namf_Communication_UEContext-Transfer response comprising the UE's SUPI and MM Context. If the Old AMF 155-2 holds information about active PDU Sessions, the Old AMF 155-2 may comprise one or more of the following information about for the existing PDU session(s) which may have already established before. In this case, in the response message may comprise. For example: SMF information (e.g. SMF identities or SMF address); UPF information (e.g. UPF identities or UPF address); PDU session ID(s); UE IPv4 Address and/or IPv6 prefix if available; and DNN (if available); and/or the like.

PDU sessions may have various names to differentiate an existing PDU session and a newly created or established PDU session. For example, an existing PDU session may be named as an old PDU session or a second PDU session, and a new PDU session may be named as a PDU session or a first PDU session. The second PDU session may be associated with the first PDU session for the same wireless device.

If the SUPI is not provided by the UE 100 nor retrieved from the Old AMF 155-2, the identity request procedure may be initiated by the New AMF 155-1 by sending an Identity Request message to the UE 100. The UE 100 may respond with an identity response message to the New AMF 155-1 comprising the SUPI. The AMF 155-1 may decide to invoke an AUSF. The AUSF 150 may initiate an authentication of the UE 100. The New AMF 155-1 may initiate NAS security functions. The New AMF 155-1 may notify the Old AMF 155-2 that the registration of the UE in the New AMF 155-1 is completed by invoking, for example, the Namf_Communication_RegistrationCompleteNotify service operation. If the PEI was not provided by the UE 100 nor retrieved from the Old AMF 155-2, the identity request procedure may be initiated by AMF 155-1 by, for example, sending an identity request message to the UE 100 to retrieve the PEI. The New AMF 155-1 may initiate an ME identity check by invoking, for example, an N5g-eir_MEIdentityCheck_Get service operation.

In an example, the New AMF 155-1 may select a UDM 140 based on the SUPI. If the AMF has changed since the last registration, or if the UE provides a SUPI which doesn't refer to a valid context in the AMF, or if the UE registers to the same AMF it has already registered to a non-3GPP access (i.e. the UE is registered over a non-3GPP access and initiates this registration procedure to add a 3GPP access), the New AMF 155-1 may invoke, for example, a the Nudm_UEContextManagement_Registration service operation towards the UDM 140. If there is no subscription context for the UE in the New AMF 155-1, the "subscription data retrieval indication" may be included. The New AMF 155-1 may provide the access type it serves for the UE to the UDM. The and the access type may be set to, for example, "3GPP access.". The UDM 140 may store the associated access type together with the serving AMF 155-1. If "the subscription data retrieval" indication was included in step 14a, the UDM 140 may invoke the Nudm_SubscriptionData_UpdateNotification service operation to provide the subscription data from the UDM 140. When the UDM 140 stores the associated access type together with the serving AMF 155-1 as indicated in step 14a, it may cause the UDM to initiate a notification (for example, a Nudm_UEContextManagement_RemoveNotification) to the Old AMF 155-2 corresponding to 3GPP access, if one exists. The Old AMF 155-2 may remove the MM context of the UE 100.

The New AMF 155-1 may select a PCF based, for example, the SUPI, an IPv4 Address and/or IPv6 prefix of the existing PDU session(s) if available, and DNN, and/or the like. If the New AMF 155-1 has not yet obtained an Access and Mobility policy for the UE 100 or if the Access and Mobility policy in the New AMF 155-1 may be no longer valid, the New AMF 155-1 may request the PCF 135 to apply operator policies for the UE 100 by creating a policy control session with the PCF 135 through, for example, a the Npcf_PolicyControl_PolicyCreate service operation. The PCF 135 may respond to the Npcf_PolicyControl_PolicyCreate service operation and provide the Access and Mobility policy data for the UE 100 to the New AMF 155-1. The new AMF may decide to select a new SMF which is different from the old SMF based on, for example: a selected Data Network Name (DNN); S-NSSAI; Subscription information from UDM; Local operator policies; Load conditions of the candidate SMFs; and/or the like.

The interactions between AMF(s), SMF(s) and UPF(s) to create PDU session(s) may be further detailed in FIG. 10. As another alternative, an old AMF may also be named as a source AMF, an old SMF may also be named as a source SMF, a new AMF may also be named as a target AMF, and a new SMF may also be named as a target SMF.

In response to the message received from actions of FIG. 10, the new AMF 155-1 may send a NAS message to (R)AN 105 which may comprise one or more of the following information: UE IPv4 and/or IPv6 prefix to the PDU session(s) if the PDU Type is IPv4 and/or IPv6; PDU Session ID(s); CN N3 tunnel info (e.g. New UPF 110-1 address or identity, and TEID) for the PDU session(s); and PDU Session Establishment Accept targeted to the UE.

The (R)AN 105 may issue AN specific signaling exchange with the UE that is related with the information received from SMF. For example, in case of a 3GPP RAN, an RRC Connection Reconfiguration may take place with the UE establishing the necessary RAN resources related to the Authorized QoS Rules for the PDU Session(s). (R)AN 105 may also allocate (R)AN N3 tunnel information comprising (R)AN address or identify and/or tunnel end identifier (TEID) of N3 tunnel for downlink for the PDU session(s), and/or correlate the (R)AN N3 tunnel with the CN N3 tunnel for the PDU session(s); and (R)AN 105 may forward the NAS message (PDU Session ID(s), N1 SM information (PDU Session Establishment Accept)) received from the new AMF 155-1 to the UE. (R)AN may provide the NAS message to the UE if the necessary RAN resources may be established and the allocation of (R)AN tunnel information may be successful. (R)AN 105 may send a message to the New AMF 155-1: N2 PDU Session Response (PDU Session ID(s), Cause, N2 SM information (PDU Session ID(s), (R)AN N3 tunnel information, list of accepted/rejected QoS profile(s))). In response to the information received from (R)AN 105, the (R)AN N3 Tunnel information may be sent to the New UPF 110-1 by the interactions between AMF(s), SMF(s) and UPF(s), such interactions to modify PDU session(s) may be further detailed in FIG. 11 comprising one or more actions. As an alternative, one or more actions in FIG. 13 may be performed.

The New AMF 155-1 may decide to modify the N2AP UE-TNLA-binding toward N3IWF by sending a N2 request message and the N3IWF may response with a N2 response message. If the Old AMF 155-2 previously requested UE context to be established in the PCF 135, the Old AMF 155-2 may terminate the UE context in the PCF 135 by invoking the Npcf_PolicyControl_PolicyDelete service operation. The New AMF 155-1 may send a registration accept message to the UE 100 indicating that the registration has been accepted, and the 5G-GUTI may be included if the New AMF 155-1 allocates a new 5G-GUTI.

The UE 100 may send a registration complete message to the New AMF 155-1 to acknowledge if a new 5G-GUTI was assigned. As an alternative, one or more actions illustrated in FIG. 11 may be performed.

Figure 13:
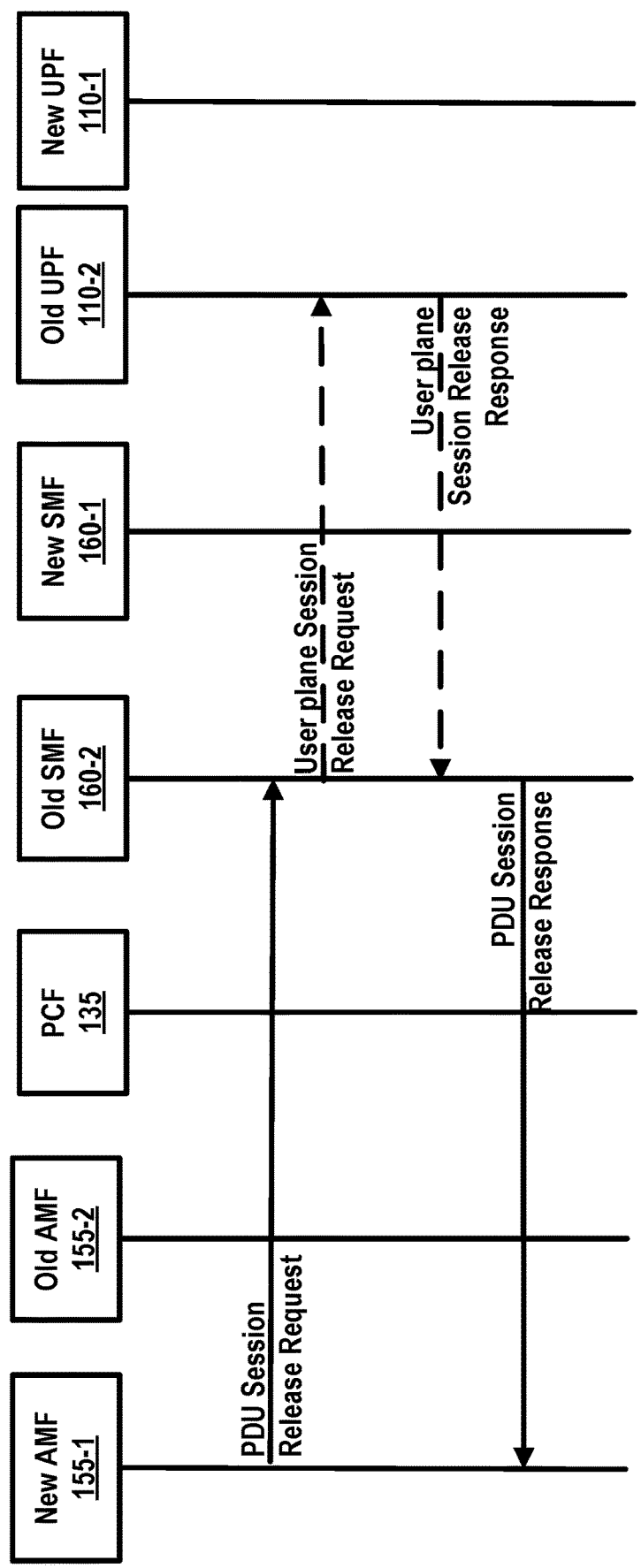
FIG. 13 is an example call flow diagram as per an aspect of an embodiment of the present invention.

The interactions between AMF(s), SMF(s) and UPF(s) to delete PDU session(s) may be further detailed in FIG. 13 comprising one or more actions. The New AMF 155-1 may send a message to the old SMF 160-2 (e.g. PDU session release request) to request releasing one or more PDU sessions comprising one or more of the following information: The S-NSSAI and/or the network slicing instance ID, the PDU session ID(s), user identity of the wireless device, and/or the Data Network Name (DNN). In response to receiving the PDU session release request message from the New AMF 155-1, the old SMF 160-2 may send a message to the Old UPF 110-2 (e.g. user plane session release request) to request releasing one or more user plane sessions for the PDU sessions comprising the information received from the new AMF 155-1. This action may be optional. In response to receiving the user plane session release request from the old SMF 160-2, the Old UPF 110-2 may release the corresponding user plane session(s) and acknowledge the old SMF 160-2 by sending a response message (e.g. user plane session release response). If the UPF 110-2 has already released the corresponding user plane session(s), the Old UPF 110-2 may acknowledge the old SMF 160-2 by sending a response message (e.g. user plane session release response). This action may be optional. The old SMF 160-2 may acknowledge the New AMF 155-1 by sending a response message (e.g. PDU session release response), and the New AMF 155-1 may further send message to (R)AN 105 and/or UE 100 to release the related resource. As an example, the UPF 110-2 may release the user plane session(s) without the request from the old SMF 160-2.

Example 3

Figure 14:
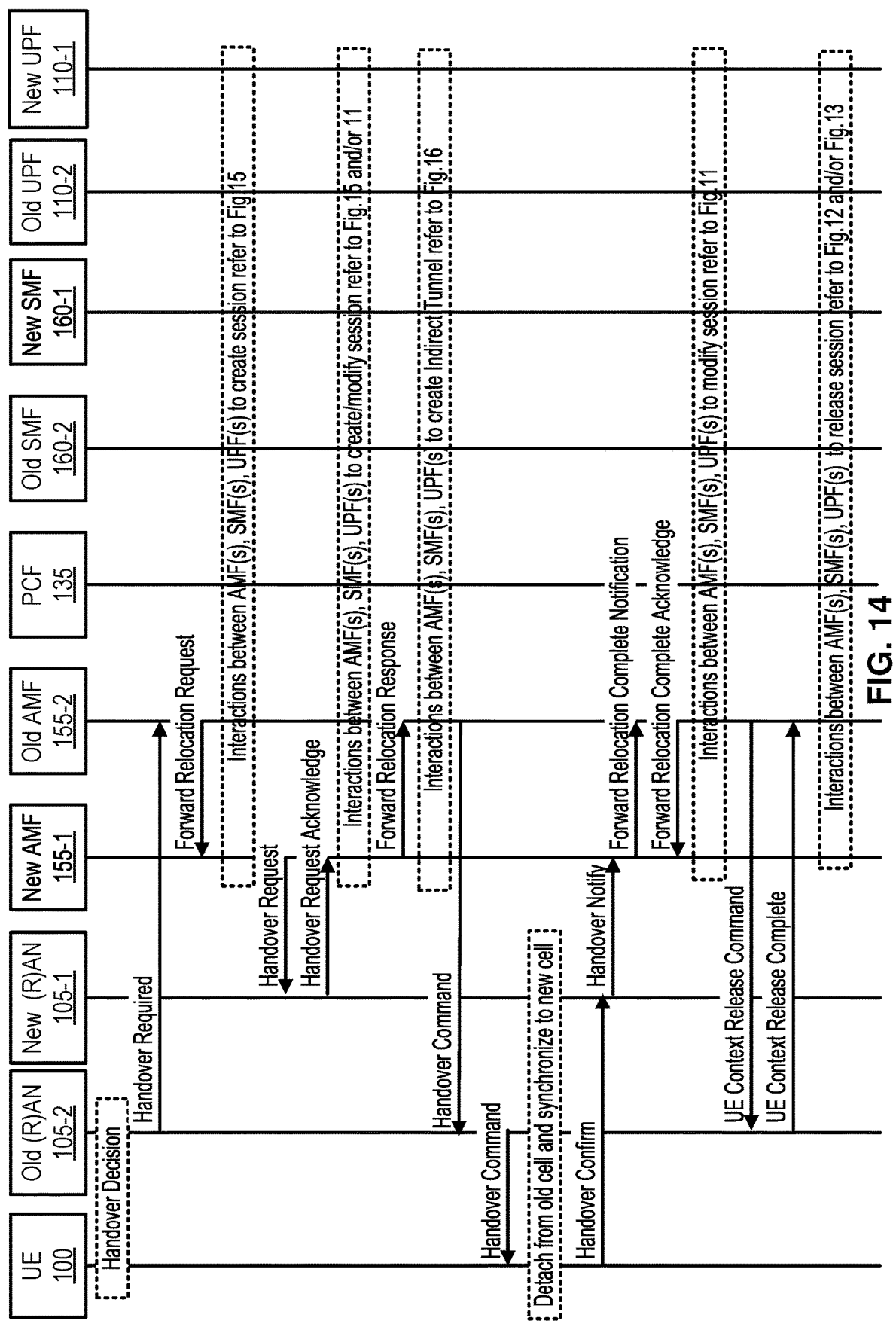
FIG. 14 is an example call flow diagram as per an aspect of an embodiment of the present invention.

In an example, the UE may be in CM-CONNECTED state, there may be inter NG-RAN node handover without Xn interface, and AMF, SMF and UPF may also be relocated at the same time. FIG. 14 shows an example call flow.

An Old (R)AN 105-2 decides to initiate a handover to a New (R)AN 105-1. The Old (R)AN 105-2 may send a message (e.g. handover required) to the Old AMF 155-2 comprising one or more of the following information: the New (R)AN Identity, the S-NSSAI and/or the network slicing instance ID, the PDU session ID(s), user identity of the wireless device, and/or the Data Network Name (DNN), In response to the message received from the Old (R)AN 105-2, the Old AMF 155-2 may send a message (e.g. forward relocation request) to a New AMF 155-1 with the information received from the Old (R)AN 105-2. If the Old AMF 155-2 holds information about active PDU Sessions, the Old AMF 155-2 may comprise one or more of the following information for the existing PDU session(s) which may have already been established before in the response message: SMF information (e.g. SMF identities or SMF address); UPF information (e.g. UPF identities or UPF address); PDU session identities; UE IPv4 Address and/or IPv6 prefix if available; and DNN if available.

In response to the message received from the Old AMF 155-2, the New AMF 155-1 may initiate the PDU session establishment. The interactions between AMF(s), SMF(s) and UPF(s) to create PDU session(s) for handover may be further detailed in FIG. 15 After receiving the message from the New SMF 160-1 in actions of FIG. 15, the New AMF 155-1 may send a message (e.g. handover request) to the New (R)AN 105-1 comprising one or more of the following information: UE IPv4 and/or IPv6 prefix to the PDU session(s) if the PDU Type is IPv4 and/or IPv6; PDU Session ID(s); and CN N3 tunnel info (e.g. New UPF 110-1 address or identity, and TEID) for the PDU session(s).

The New (R)AN 105-1 may take one or more actions. The New (R)AN 105-1 may allocate (R)AN N3 tunnel information (e.g. New (R)AN 105-1 address or identify, TEID) for the PDU Session(s), and correlate the (R)AN N3 tunnel with the CN N3 tunnel for the PDU session(s); and the New (R)AN 105-1 may response the New AMF 155-1 by sending a message (e.g. handover request acknowledge) comprising one or more of the following information: UE IPv4 and/or IPv6 prefix to the PDU session(s), PDU Session ID(s), (R)AN N3 tunnel information, and/or the list of accepted/ rejected QoS profile(s).

Figure 15:
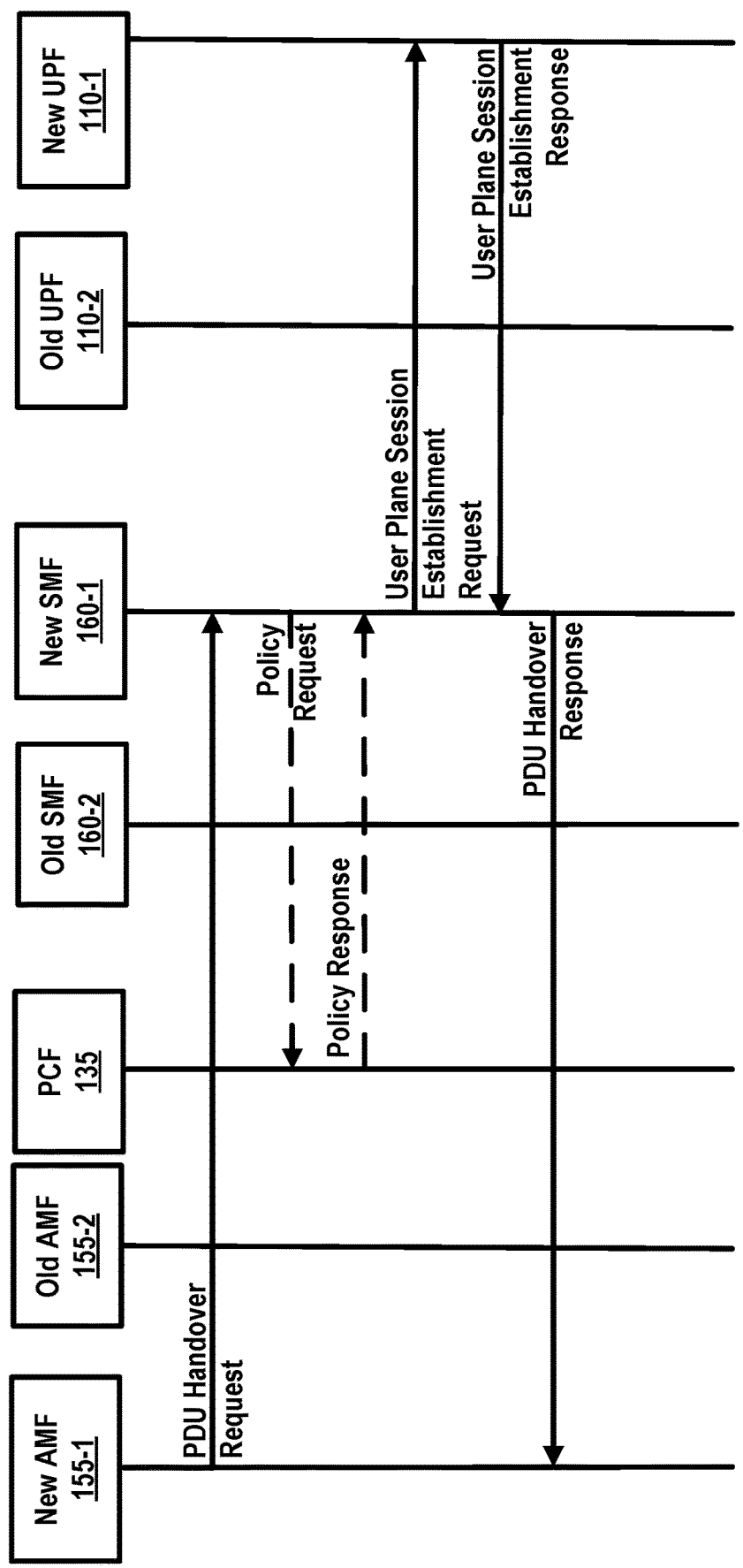
FIG. 15 is an example call flow diagram as per an aspect of an embodiment of the present invention.

If action(s) in FIG. 15 are performed, the interactions between AMF(s), SMF(s) and UPF(s) in FIG. 11 comprising one or more actions to modify PDU session(s) for handover may be performed, wherein the (R)AN N3 tunnel information FIG. 11 refers to the N3 tunnel information of the New (R)AN 105-1 (e.g. New (R)AN 105-1 address or identify, TEID) for the PDU Session(s); and if action(s) in FIG. 15 have not been performed, the interactions between AMF(s), SMF(s) and UPF(s) in FIG. 15 comprising one or more actions to create PDU session(s) for handover may be performed.

In response to the message (e.g. forward relocation request) received from the Old AMF 155-2, the New AMF 155-1 may send a response message (e.g. forward relocation response) to the Old AMF 155-2 comprising one or more of the following information: UE IPv4 and/or IPv6 prefix to the PDU session(s), CN N3 tunnel info (e.g. New UPF 110-1 address or identity, and TEID) for the PDU session(s) and/or PDU Session ID(s).

If indirect forwarding applies, the Old AMF 155-2 may initiate the indirect data forwarding tunnel request. The interactions between AMF(s), SMF(s) and UPF(s) to create indirect data forwarding tunnel may be further detailed in FIG. 16 comprising one or more actions.

Figure 16:
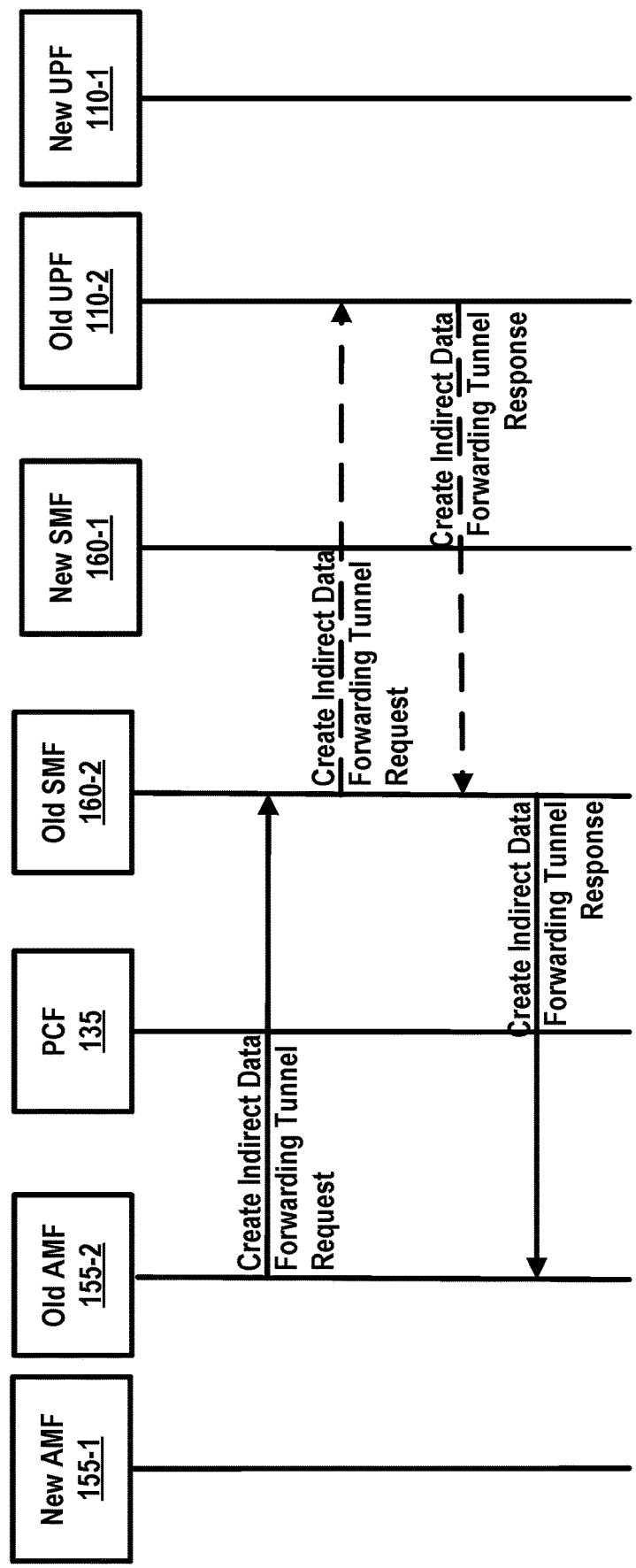
FIG. 16 is an example call flow diagram as per an aspect of an embodiment of the present invention.

In response to the message received in action of FIG. 16, the Old AMF 155-2 may send a message (e.g. handover command) to the Old RAN 105-2 comprising one or more of the following information: UE IPv4 and/or IPv6 prefix to the PDU session(s), Old UPF indirect data forwarding tunnel information (e.g. Old UPF 110-2 address or identity, and TEID) for the PDU session(s) and/or PDU Session ID(s). In response to the message from the Old AMF 155-2, the Old RAN 105-2 may send a message (e.g. handover command) to UE 100 comprising the UE IPv4 and/or IPv6 prefix to the PDU session(s),) and/or the PDU Session ID(s), the UE may remove any PDU sessions for which it did not receive the corresponding PDU sessions in the target cell. The Old (R)AN 105-2 may start forwarding the downlink data from the Old (R)AN 105-2 to the Old UPF 110-2, the Old UPF 110-2 forward the data to the New UPF 110-1, and then the New UPF 110-1 forward the data to the New (R)AN 105-1. After the UE 100 has successfully synchronized to the target cell, it may send a message (e.g. handover confirm message) to the New (R)AN 105-1. By this message, the handover may be considered as successful by the UE. In response to receiving the message from the UE 100, the New (R)AN 105-1 may send a message (e.g. handover notify) to the New AMF 155-1. By this message, the handover may be considered as successful in the New (R)AN 105-1. In response to receiving the message from the New (R)AN 105-1, the New AMF 155-1 may send a message (e.g. forward relocation complete notification) to the Old AMF 155-2, and the Old AMF 155-2 may response the New AMF 155-1 by sending a message (e.g. forward relocation complete acknowledge).

The interactions between AMF(s), SMF(s) and UPF(s) to modify PDU session(s) may refer to FIG. 11, and detailed actions described for FIG. 11 may refer to Example 1.

The Old AMF 155-2 may send a message to the Old (R)AN 105-2 (e.g. UE context release command), the Old (R)AN 105-2 may release its resources related to the UE and may respond the Old AMF 155-2 with a message (e.g. UE context release complete). The interactions between AMF(s), SMF(s) and UPF to release PDU session(s) may refer to FIG. 12, and detailed actions described for FIG. 12 may refer to Example 1.

FIG. 15 is an example call flow diagram as per an aspect of an embodiment of the present invention. The New AMF 155-1 may send a message to a New SMF 160-1, (e.g. PDU handover request) to request establishing one or more PDU sessions because of the handover. The message may comprise one or more information elements. The message may comprise an S-NSSAI and/or a network slicing instance ID. The S-NSSAI comprises a Slice/Service type (SST) and A Slice Differentiator (SD) which indicate expected network slice behavior in terms of features and services; and the network slicing instance ID is to identify a network slicing instance. The message may comprise PDU Session IDs for one or more PDU sessions. The PDU Session ID is to identify a PDU session. The message may comprise user identity of the wireless device. The user identity of the wireless device may be the UE IPv4 address and/or IPv6 prefix for the existing PDU session(s), the UE NAI and/or Subscriber Permanent Identifier (SUPI), etc. The message may comprise Data Network Name (DNN). The DNN is equivalent to an APN, which may be used to select N6 interface(s) for a PDU session, and/or determine policies to apply to the PDU session. The message may comprise UPF information (e.g. UPF identities or UPF address). The message may comprise the (R)AN N3 tunnel information (e.g. (R)AN address or identify, TEID) for the PDU Session(s) if available.

In response to the message from the New AMF 155-1, the New SMF 160-1 may take one or more of the following actions. The New SMF 160-1 may allocate UE IPv4 and/or IPv6 prefix to the PDU session(s) if the PDU Type is IPv4 and/or IPv6. The New SMF 160-1 may allocate an IPv6 prefix for the PDU session(s) and N6 point-to-point tunneling if the PDU Type is Ethernet PDU and/or Unstructured PDU, where the N6 tunnel may be used to transmit the user data between the UPF and a Data Network. The New SMF 160-1 may allocate the CN N6 tunnel info (e.g. New UPF 110-1 address or identity, and tunnel endpoint identifier (e.g. TEID)) and CN N3 tunnel info (e.g. New UPF 110-1 address or identity, and TEID) for the PDU session(s). The New SMF 160-1 may select a PCF. The New SMF 160-1 may select the same PCF which has already served the existing PDU session(s) identified by PDU session ID(s), and the New SMF 160-1 may select the same PCF based on one or more of the following information: The SUPI; UE IPv4 address and/or IPv6 prefix for the existing PDU session(s); and DNN. Alternatively, the New SMF 160-1 may select a new PCF. The New SMF 160-1 may send a message to the PCF 135, (e.g. policy request) to request policy(s) for the PDU session(s); the message may comprise one or more of the following information elements: an indication (e.g. handover indication) to indicate that the AMF and/or SMF is relocated; the information received from the New AMF 155-1, which may include the UE IPv4 address and/or IPv6 prefix for the existing PDU session(s); the new allocated UE IPv4 and/or IPv6 prefix to the PDU session(s) if the PDU Type is IPv4 and/or IPv6; and the IPv6 prefix for the PDU session(s) and N6 point-to-point tunneling if the PDU Type is Ethernet PDU and/or Unstructured PDU.

The PCF 135 may take one or more of the following actions. The PCF 135 may make the policy decision based on the information received from the New SMF 160-1 and/or other information (e.g. subscription information). If the same PCF is selected by the New SMF 160-1, the PCF may update the PDU session context for each of the PDU session ID, by replacing the stored PDU session information with the new received information (e.g. replacing UE IPv4 address and/or IPv6 prefix of the existing PDU session with the new allocated UE IPv4 and/or IPv6 prefix to the PDU session; replacing the address or identity of Old SMF 160-2 with the address or identity of the New SMF 160-1). If the same PCF is selected by the New SMF 160-1, the PCF may create a new PDU session context for each of the PDU session ID comprising the PDU session ID, the new allocated UE IPv4 and/or IPv6 prefix to the PDU session(s), the address or identity of the New SMF 160-1, the SUPI, and/or DNN; and mark the existing PDU session context for the same PDU session ID as inactive. The PCF may release the existing PDU session context at this action or in the later action. The PCF 135 may send a message to the New SMF 160-1 (e.g. policy response) by providing one or more of the following policies: QoS policy for the PDU session(s); charging policy for the PDU session(s); traffic Steering Control for steering traffic; and other policies.

Based on the UPF information (e.g. UPF identities or UPF address) received from the New AMF 155-1 and the policy received from the PCF 135, the New SMF 160-1 may select a new UPF 110-1 and send a message to the New UPF 110-1 (e.g. user plane session establishment request) to request establishing user plan session(s) for the PDU session(s). (s)

The message sent to the New UPF 110-1 may comprise an indication (e.g. handover indication) to indicate that the AMF and/or SMF is relocated. The message may comprise the (R)AN N3 tunnel information (e.g. New (R)AN 105-1 address or identify, TEID) for the PDU Session(s) if available. The message may comprise the S-NSSAI and/or the network slicing instance ID. The message may comprise the PDU session ID(s). The message may comprise the user identity of the wireless device. The message may comprise the Data Network Name (DNN). The message may comprise the CN N6 tunnel info (e.g. New UPF 110-1 address or identity, and TEID) and CN N3 tunnel info (e.g. New UPF 110-1 address or identity, and TEID) for the PDU session(s) if the corresponding tunnel info is allocated by the SMF. The message may comprise the policies for the PDU sessions.

Based on the message received from the New SMF 160-1, the New UPF 110-1 may set up the user plane session(s). The New UPF 110-1 may create a new user plane session context for each of the PDU session ID comprising one or more elements of the message received from the New SMF 160-1, and the address or identity of the New SMF 160-1. The New UPF 110-1 may correlate the CN N3 tunnel info (e.g. New UPF 110-1 address or identity, and TEID) with (R)AN N3 tunnel info (e.g. New (R)AN 105-1 address or identity, and TEID) for the PDU session(s) if the (R)AN N3 tunnel info is available. The New UPT 110-1 may acknowledges the New SMF 160-1 by sending a response message (e.g. user plane session establishment response). The), the New UPF 110-1 may include the CN N6 tunnel info (e.g. New UPF 110-1 address or identity, and TEID) and CN N3 tunnel info (e.g. New UPF 110-1 address or identity, and TEID) for the PDU session(s) if the corresponding tunnel info is allocated by the UPF.

The New SMF 160-1 may acknowledge the New AMF 155-1 by sending a response message (e.g. PDU handover response). The New SMF 160-1 may include one or more of the following information: UE IPv4 and/or IPv6 prefix to the PDU session(s) if the PDU Type is IPv4 and/or IPv6; The allowed S-NSSAI and/or the network slicing instance ID; The PDU session ID(s); The user identity of the wireless device; The Data Network Name (DNN); The CN N3 tunnel info (e.g. New UPF 110-1 address or identity, and TEID) for the PDU session(s); and the policies for the PDU sessions.

FIG. 16 is an example call flow diagram as per an aspect of an embodiment of the present invention. If indirect forwarding applies, the Old AMF 155-2 may initiate the indirect data forwarding tunnel request by sending to the Old SMF 160-2 a message (e.g. create indirect data forwarding tunnel request), the Old AMF 155-2 may comprise one or more of the following information in the message: The PDU session ID(s); New UPF indirect data forwarding tunnel information (e.g. New UPF 110-1 address or identity, and TEID) for the PDU session(s)); and UE IPv4 and/or IPv6 prefix to the PDU session(s). In response to the message received from the Old AMF 155-2, the Old SMF 160-2 may send the Old UPF 110-2 a message (e.g. create indirect data forwarding tunnel request) with the information received from the Old AMF 155-2. In response to the message received from the Old SMF 160-2, the Old UPF 110-2 may take one or more of actions. The Old UPF 110-2 may setup an indirect data forwarding tunnel by allocating the Old UPF indirect data forwarding tunnel information (e.g. Old UPF 110-2 address or identity, and TEID) for the PDU session(s)). The Old UPF 110-2 may correlate the Old UPF indirect data forwarding tunnel information with the New UPF indirect data forwarding tunnel information (e.g. New UPF 110-1 address or identity, and TEID) for the PDU session(s)). The Old UPF 110-2 may response to the Old SMF 160-2 a message comprising one or more of the following information: the PDU session ID(s); Old UPF indirect data forwarding tunnel information (e.g. Old UPF 110-2 address or identity, and TEID) for the PDU session(s)); and UE IPv4 and/or IPv6 prefix to the PDU session(s). In response to the message received from the Old UPF 110-2, the Old SMF 160-2 may send a message to the Old AMF 155-2 (e.g. create indirect data forwarding tunnel response) with the information received from the Old UPF 110-2.

Example 4

This example is similar to example 3 and may have the differences that the action(s) of FIG. 12 in example 3 may be replaced by action(s) of FIG. 13 in example 4.

FIG. 14 shows an example call flow which may comprise one or more of the following actions. The Old (R)AN 105-2 may decide to initiate a handover to the New (R)AN 105-1. The Old (R)AN 105-2 may send a message (e.g. handover required) to the Old AMF 155-2 comprising one or more of the following information: the New (R)AN Identity, the S-NSSAI and/or the network slicing instance ID, the PDU session ID(s), user identity of the wireless device, and/or the Data Network Name (DNN). In response to the message received from the Old (R)AN 105-2, the Old AMF 155-2 may send a message (e.g. forward relocation request) to a New AMF 155-1 with the information received from the Old (R)AN 105-2. If the Old AMF 155-2 holds information about active PDU Sessions, the Old AMF 155-2 may comprise one or more of the following information for the existing PDU session(s) which may have already been established before in the response message: SMF information (e.g. SMF identities or SMF address); UPF information (e.g. UPF identities or UPF address); PDU session identities; UE IPv4 Address and/or IPv6 prefix if available; and DNN if available. In response to the message received from the Old AMF 155-2, the New AMF 155-1 may initiate the PDU session establishment.

The interactions between AMF(s), SMF(s) and UPF(s) to create PDU session(s) for handover may be further detailed in FIG. 15 comprising one or more actions. After receiving the message from the New SMF 160-1 in action of FIG. 15, the New AMF 155-1 may send a message (e.g. handover request) to the New (R)AN 105-1 comprising one or more of the following information: UE IPv4 and/or IPv6 prefix to the PDU session(s) if the PDU Type is IPv4 and/or IPv6; PDU Session ID(s); and CN N3 tunnel info (e.g. New UPF 110-1 address or identity, and TEID) for the PDU session(s).

The New (R)AN 105-1 may allocate (R)AN N3 tunnel information (e.g. New (R)AN 105-1 address or identify, TEID) for the PDU Session(s), and correlate the (R)AN N3 tunnel with the CN N3 tunnel for the PDU session(s). The New (R)AN 105-1 may response the New AMF 155-1 by sending a message (e.g. handover request acknowledge) comprising one or more of the following information: UE IPv4 and/or IPv6 prefix to the PDU session(s), PDU Session ID(s), (R)AN N3 tunnel information, and/or the list of accepted/rejected QoS profile(s).

If action(s) in FIG. 15 have been performed, the interactions between AMF(s), SMF(s) and UPF(s) in FIG. 11 comprising one or more actions to modify PDU session(s) for handover may be performed, wherein the (R)AN N3 tunnel information in FIG. 11 refer to the N3 tunnel information of the New (R)AN 105-1 (e.g. New (R)AN 105-1 address or identify, TEID) for the PDU Session(s). If action(s) in FIG. 15 have not been performed, the interactions between AMF(s), SMF(s) and UPF(s) in FIG. 15 comprising one or more actions to create PDU session(s) for handover may be performed. In response to the message (e.g. forward relocation request) received from the Old AMF 155-2, the New AMF 155-1 may send a response message (e.g. forward relocation response) to the Old AMF 155-2 comprising one or more of the following information: UE IPv4 and/or IPv6 prefix to the PDU session(s), CN N3 tunnel info (e.g. New UPF 110-1 address or identity, and TEID) for the PDU session(s) and/or PDU Session ID(s). If indirect forwarding applies, the Old AMF 155-2 may initiate the indirect data forwarding tunnel request. The interactions between AMF(s), SMF(s) and UPF(s) to create indirect data forwarding tunnel may be further detailed in FIG. 16 comprising one or more actions. In response to the message from the Old RAN 105-2 received in actions of FIG. 16, the Old AMF 155-2 may send a message (e.g. handover command) to the Old RAN 105-2 comprising one or more of the following information: UE IPv4 and/or IPv6 prefix to the PDU session(s), CN N3Old UPF indirect data forwarding tunnel information (e.g. Old UPF 110-2 address or identity, and TEID) for the PDU session(s) and/or PDU Session ID(s).

In response to the message from the Old AMF 155-2, the Old RAN 105-2 may send a message (e.g. handover command) to UE 100 comprising the UE IPv4 and/or IPv6 prefix to the PDU session(s)) and/or the PDU Session ID(s), the UE may remove any PDU sessions for which it did not receive the corresponding PDU sessions in the target cell.

The Old (R)AN 105-2 may start forwarding the downlink data from the Old (R)AN 105-2 to the Old UPF 110-2, the Old UPF 110-2 forward the data to the New UPF 110-1, and then the New UPF 110-1 forward the data to the New (R)AN 105-1. After the UE 100 has successfully synchronized to the target cell, it may send a message (e.g. handover confirm message) to the New (R)AN 105-1. By this message, the handover may be considered as successful by the UE. In response to receiving the message from the UE 100, the New (R)AN 105-1 may send a message (e.g. handover notify) to the New AMF 155-1. By this message, the handover may be considered as successful in the New (R)AN 105-1. In response to receiving the message from the New (R)AN 105-1, the New AMF 155-1 may send a message (e.g. forward relocation complete notification) to the Old AMF 155-2, and the Old AMF 155-2 may response the New AMF 155-1 by sending a message (e.g. forward relocation complete acknowledge).

The interactions between AMF(s), SMF(s) and UPF(s) to modify PDU session(s) may refer to FIG. 11, and detailed description for FIG. 11 may refer to Example 1. The Old AMF 155-2 may send a message to the Old (R)AN 105-2 (e.g. UE context release command), the Old (R)AN 105-2 may release its resources related to the UE and may respond the Old AMF 155-2 with a message (e.g. UE context release complete). The interactions between AMF(s), SMF(s) and UPF(s) to release PDU session(s) may refer to FIG. 13, and actions described for FIG. 13 may refer to Example 2.

According to various embodiments, a device such as, for example, a wireless device, off-network wireless device, a base station, a core network device, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 17:
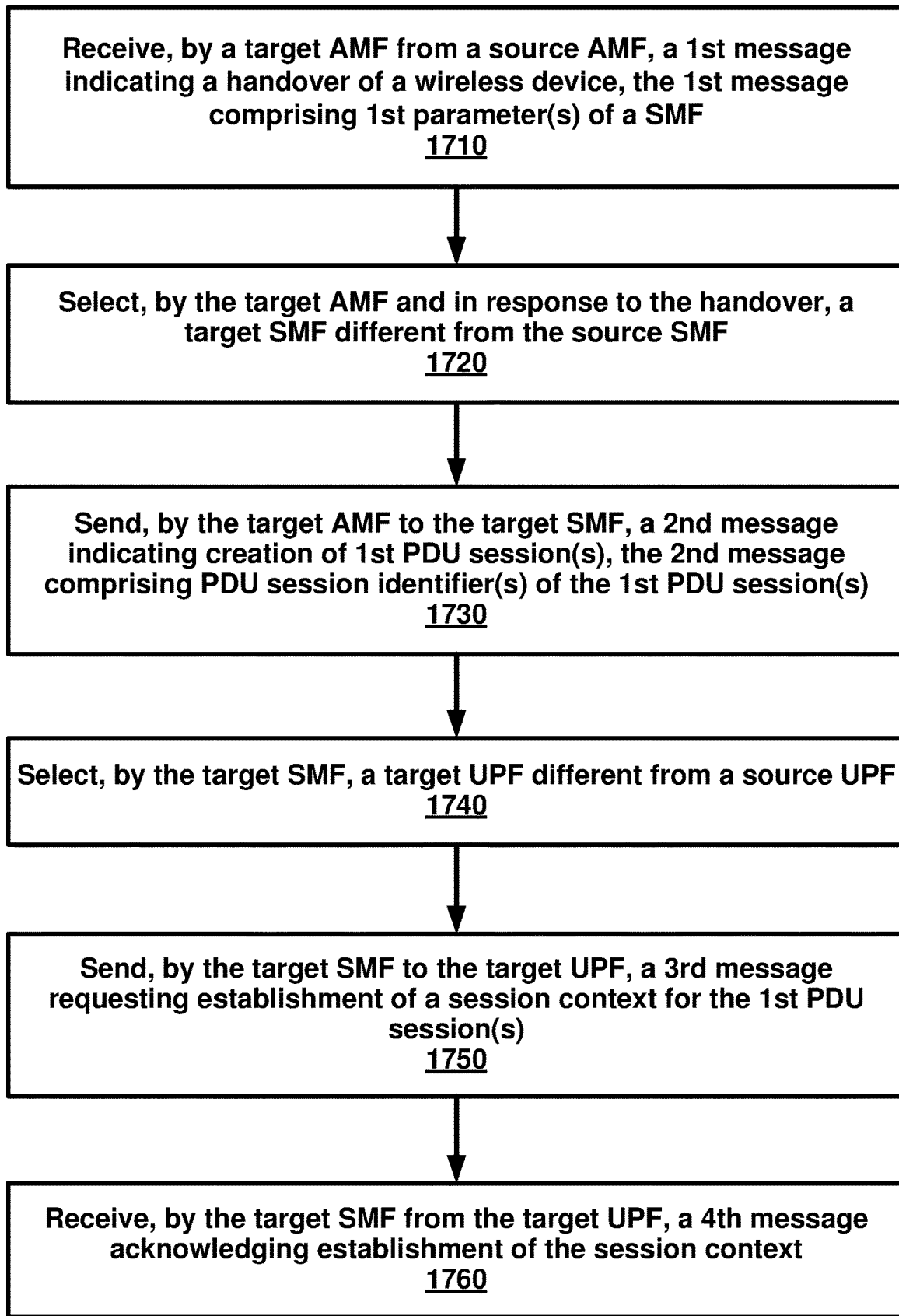
FIG. 17 is an example call flow diagram as per an aspect of an embodiment of the present invention.

FIG. 17 is a flow diagram of an aspect of an embodiment of the present disclosure. At 1710, a target access and mobility management function (AMF) may receive a first message from a source AMF. The first message may indicate a handover of a wireless device. The first message may comprise one or more first parameters of a source session management function (SMF). At 1720, the target AMF may select a target SMF that is different from the source SMF in response to the handover. At 1730, the target AMF may send a second message to the target SMF. The second message may indicate creation of at least one first packet data unit (PDU) session. The second message may comprise at least one PDU session identifier of the at least one first PDU session. At 1740, the target SMF may select a target user plane function (UPF) different from a source UPF. At 1750, the target SMF may send a third message to the target UPF. The third message may request establishment of a session context for the at least one first PDU session. At 1760, the target SMF may receive a fourth message from the target UPF. The fourth message may acknowledge establishment of the session context.

According to an example embodiment, the one or more first parameters of the source SMF may comprise an identity of the source SMF. According to an example embodiment, the one or more first parameters of the source SMF may comprise an address of the source SMF. According to an example embodiment, the source AMF may receive a fifth message from a source base station. The fifth message may comprise at least one second PDU session identifier of at least one second PDU session. The fifth message may comprise a handover request for the wireless device. According to an example embodiment, the source AMF may receive a response message for the first message from the target AMF. The response message may indicate a forward relocation response for the wireless device. According to an example embodiment, the source AMF may send a fifth message to a source base station based on the response message. The fifth message may indicate a handover command for the wireless device. According to an example embodiment, the second message may comprise a single network slice selection assistance information. The second message may comprise a network slicing instance identifier. The second message may comprise a data network name. The second message may comprise a user identity of the wireless device. The user identity may comprise an IPv4 address for the at least one PDU session. The user identity may comprise an IPv6 prefix for the at least one PDU session. The user identity may comprise a network access identifier; or a subscriber permanent identifier. According to an example embodiment, the first message may indicate establishment of the at least one first PDU session. The first message may comprise the at least one PDU session identifier of the at least one first PDU session. The first message may comprise a first Internet protocol (IP) address of the wireless device. The first message may comprise a data network name. According to an example embodiment, the third message may comprise a single network slice selection assistance information. The third message may comprise a network slicing instance identifier. The third message may comprise the at least one PDU session identifier for the at least one first PDU session. The third message may comprise a user identity of the wireless device. The third message may comprise a data network name. The third message may comprise core network N6 tunnel information for the at least one first PDU session. The third message may comprise core network N3 tunnel information for the at least one first PDU session. The third message may comprise a policy for the at least one first PDU session. According to an example embodiment, the target UPF may create a user plane session context for one or more of the at least one first PDU session in response to receiving the third message. The user plane session context may comprise one or more information elements of the third message. The user plane session context may comprise an address of the target SMF. The user plane session context may comprise an identify of the target SMF. According to an example embodiment, the at least one first PDU session may comprise at least one new PDU session. According to an example embodiment, the first message may comprise one or more second parameters of the source UPF for at least one second PDU session associated with the at least one first PDU session. According to an example embodiment, the one or more second parameters of the source UPF may comprise an identity of the source UPF. The one or more second parameters of the source UPF may comprise an address of the source UPF. According to an example embodiment, the at least one second PDU session may comprise at least one existing PDU session. According to an example embodiment, the target AMF may send a fifth message to the source SMF. The fifth message may indicate an update of at least one second PDU session associated with the at least one first PDU session. According to an example embodiment, the update of the at least one second PDU session may comprise releasing the at least one second PDU session.

According to an example embodiment, the source AMF may receive a first update request message from the target AMF. The first update request message may request an update of at least one second PDU session. According to an example embodiment, the source AMF may send a second update request message to the source SMF. The second update request message may request the update of the at least one second PDU session. According to an example embodiment, the source AMF may receive a first update response message from the source SMF. The first update response message may indicate completion of the update of the at least one second PDU session. According to an example embodiment, the source AMF may send a second update response message to the target AMF. The second update response message may indicate the completion of the update of the at least one second PDU session. According to an example embodiment, the update of the at least one second PDU session may comprise releasing the at least one second PDU session.

According to an example embodiment, the source AMF may receive a first release request message from the target AMF. The first release request message may request release of at least one second PDU session associated with the at least one first PDU session. According to an example embodiment, the source AMF may send a second release request message to the source SMF. The second release request message may request the release of the at least one second PDU session. According to an example embodiment, the source AMF may receive a first release response message from the source SMF. The first release response message may indicate completion of the release of the at least one second PDU session. According to an example embodiment, the source AMF may send a second release response message to the target AMF. The second release response message may indicate the completion of the release of the at least one second PDU session. According to an example embodiment, the source SMF may send a user plane session release message to a source UPF in response to receiving the second release request message. The user plane session release message may request release of one or more user plane sessions of the at least one second PDU session. According to an example embodiment, the source SMF may receive a response message from the source UPF. The response message may indicate release of the one or more user plane sessions.

According to an example embodiment, the target SMF may send a fifth message to a policy control function. The fifth message may comprise a handover indication that the source AMF and the source SMF are relocated. The fifth message may comprise a request for one or more policies for the at least one first PDU session of the wireless device. According to an example embodiment, the target SMF may receive a sixth message from the policy control function in response to the fifth message. The sixth message may comprise at least one policy for the at least one first PDU session. According to an example embodiment, the target SMF may select the target UPF based on UPF information received from the target AMF. The target SMF may select the target UPF based on the at least one policy. According to an example embodiment, the fifth message may comprise a first Internet Protocol (IP) address of the wireless device for the at least one first PDU session. The first IP address may be allocated by the target SMF. The fifth message may comprise a second IP address of the wireless device for the at least one second PDU session. The second IP address may be allocated by the source SMF. According to an example embodiment, the first IP address and the second IP address may comprise an IPv4 address. The first IP address and the second IP address may comprise an IPv6 prefix. According to an example embodiment, in response to receiving the fifth message, the policy control function may replace the first IP address of the wireless device with the second IP address. In response to receiving the fifth message, the policy control function may create a PDU session context for one or more of the at least one first PDU session. The PDU session context may comprise one or more PDU session identifiers of the one or more of the at least one first PDU session. The PDU session context may comprise the second IP address.

According to an example embodiment, the target AMF may receive a fifth message from the target SMF. The fifth message may indicate confirmation for creation of the at least one first PDU session. According to an example embodiment, the target AMF may send a sixth message to a target base station in response to receiving the fifth message. The sixth message may indicate a handover request for the wireless device. According to an example embodiment, the target AMF may receive a seventh message from the target base station. The seventh message may indicate a handover acknowledgement for the handover request. According to an example embodiment, the sixth message may comprise the at least one PDU session identifier for the at least one first PDU session. The sixth message may comprise a first Internet Protocol address of the wireless device for the at least one first PDU session. The sixth message may comprise core network N3 tunnel information for the at least one first PDU session. According to an example embodiment, the seventh message may comprise the at least one PDU session identifier for the at least one first PDU session. The seventh message may comprise a first Internet Protocol address of the wireless device for the at least one first PDU session. The seventh message may comprise radio access network N3 tunnel information for the at least one first PDU session.

According to an example embodiment, a source SMF may receive a fifth message from a source AMF. The fifth message may request establishment of a data forwarding tunnel. The fifth message may comprise the at least one PDU session identifier for the at least one first PDU session. The fifth message may comprise target UPF data forwarding tunnel information. The fifth message may comprise an Internet Protocol address of the wireless device. The Internet Protocol address may comprise an IPv4 address. The Internet Protocol address may comprise an IPv6 prefix. According to an example embodiment, the source SMF may send a sixth message to the source UPF. The sixth message may request the establishment of the data forwarding tunnel. The sixth message may comprise the at least one PDU session identifier. The sixth message may comprise the target UPF data forwarding tunnel information. The sixth message may comprise the Internet Protocol address of the wireless device. According to an example embodiment, the source SMF may receive a first response message for the sixth message from the source UPF. The first response message may comprise the at least one PDU session identifier. The first response message may comprise source UPF data forwarding tunnel information. The first response message may comprise the Internet Protocol address of the wireless device. According to an example embodiment, the source SMF may send a second response message for the fifth message to the source AMF. The second response message may comprise the at least one PDU session identifier. The second response message may comprise source UPF data forwarding tunnel information. The second response message may comprise the Internet Protocol address of the wireless device. According to an example embodiment, the target UPF data forwarding tunnel information may comprise an address or identity of the target UPF. The target UPF data forwarding tunnel information may comprise a tunnel endpoint identifier for the at least one first PDU session. According to an example embodiment, the source UPF data forwarding tunnel information may comprise an address or identity of the source UPF. The source UPF data forwarding tunnel information may comprise a tunnel endpoint identifier for the at least one first PDU session. According to an example embodiment, the source AMF may receive a handover required message for the wireless device from a source base station. According to an example embodiment, the source AMF may send the first message in response to receiving the handover required message.

Figure 18:
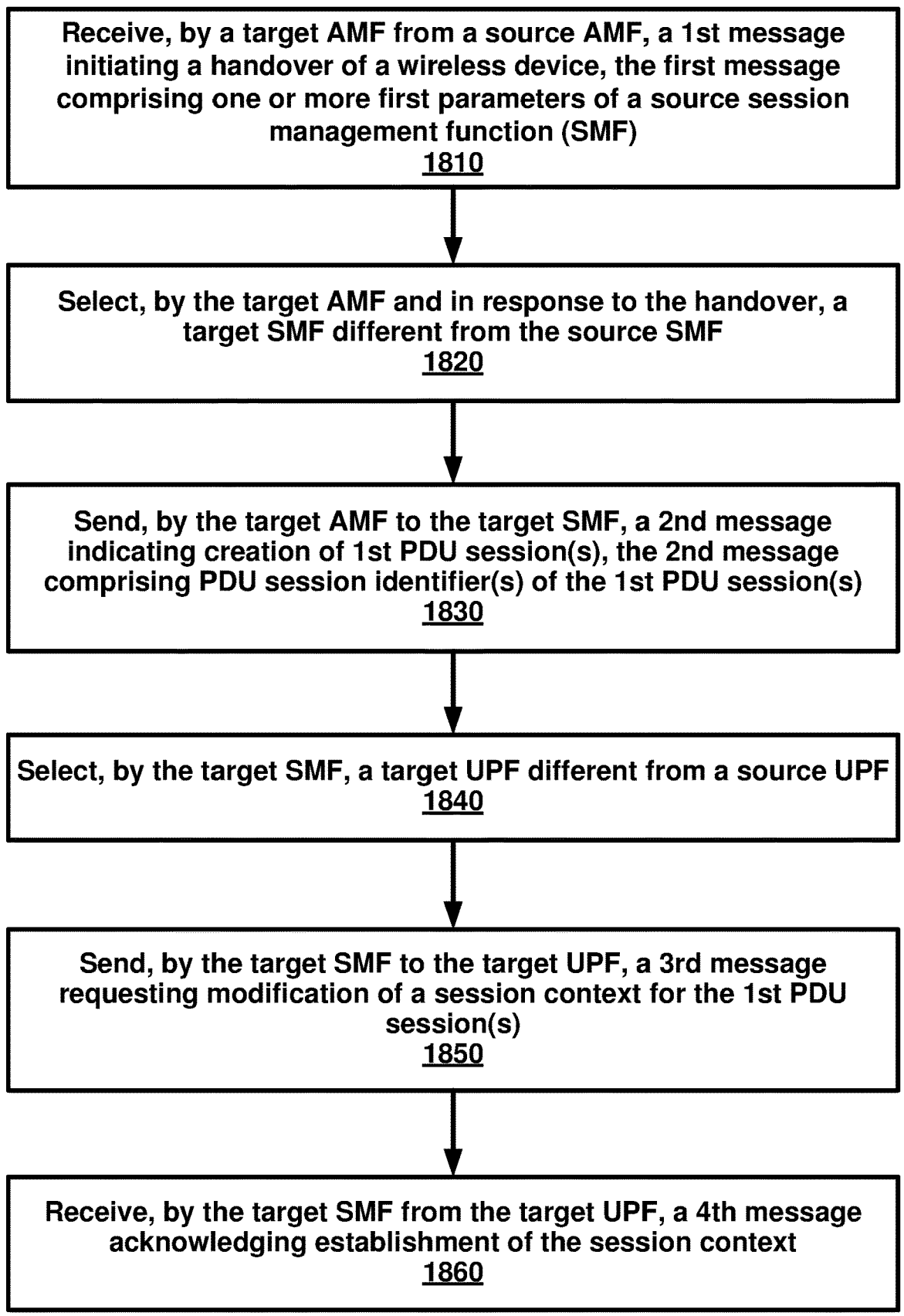
FIG. 18 is an example call flow diagram as per an aspect of an embodiment of the present invention.

FIG. 18 is a flow diagram of an aspect of an embodiment of the present disclosure. At 1810, a target access and mobility management function (AMF) may receive a first message from a source AMF. The first message may initiate a handover of a wireless device. The first message may comprise one or more first parameters of a source session management function (SMF). At 1820, the target AMF may select a target SMF different from the source SMF in response to the handover. At 1830, the target AMF may send a second message to the target SMF. The second message may indicate creation of at least one first packet data unit (PDU) session. The second message may comprise at least one PDU session identifier of the at least one first PDU session. At 1840, the target SMF may select a target user plane function (UPF) different from the source UPF. At 1850, the target SMF may send a third message to the target UPF. The third message may request modification of session context for the at least one first PDU session. At 1860, the target SMF may receive a fourth message from the target UPF. The fourth message may acknowledge establishment of the session context.

FIG. 19 is a flow diagram of an aspect of an embodiment of the present disclosure. At 1910, a target access and mobility management function (AMF) may receive a first message from a source AMF. The first message may comprise one or more parameters of a source session management function (SMF). The first message may comprise one or more identifiers of at least one packet data unit (PDU) session of a wireless device. The source SMF may maintain the at least one PDU session. At 1920, the target AMF may select a target SMF different from the source SMF. At 1930, the target AMF may send a second message to the target SMF. The second message may comprise the one or more identifiers of at least one PDU session. The second message may comprise a user identity of the wireless device. At 1940, the target AMF may receive a handover notify message from a target base station. The handover notify message may indicate that a handover of the wireless device may be successful. At 1950, the target AMF may send a third message to the source AMF in response to receiving the handover notify message. The third message may request release of the at least one PDU session.

FIG. 20 is a flow diagram of an aspect of an embodiment of the present disclosure. At 2010, a target access and mobility management function (AMF) may receive a first message from a source AMF. The first message may comprise one or more parameters of a source session management function (SMF). The first message may comprise one or more identifiers of at least one packet data unit (PDU) session of a wireless device. The source SMF may maintain the at least one PDU session. At 2020, the target AMF may select a target SMF different from the source SMF. At 2030, the target AMF may send a second message to the target SMF. The second message may comprise the one or more identifiers of at least one PDU session. The second message may comprise a user identity of the wireless device. At 2040, the target AMF may receive a handover notify message from a target base station. The handover notify message may indicate that a handover of the wireless device may be successful. At 2050, the target AMF may send a third message to the source SMF in response to receiving the handover notify message. The third message may request release of the at least one PDU session.

FIG. 21 is a flow diagram of an aspect of an embodiment of the present disclosure. At 2110, a target session management function (SMF) may receive a first message from a target access and mobility management function (AMF). The first message may comprise one or more identifiers of at least one packet data unit (PDU) session of a wireless device. The first message may comprise a first Internet Protocol (IP) address of the wireless device. At 2120, the target SMF may send a second message to a policy control function. The second message may request for one or more policies of the at least one PDU session of the wireless device. The second message may comprise a handover indication that a source AMF and a source SMF are relocated. The second message may comprise the first IP address. The second message may comprise a second IP address of the wireless device. At 2130, the target SMF may receive a third message from the policy control function in response to the second message. The third message may comprise one or more policies. At 2140, the target SMF may send a fourth message to a user plan function (UPF). The fourth message may request a user plane session establishment or modification for the at least one PDU session. The fourth message may comprise a handover indication that the source SMF is relocated. The fourth message may comprise the second IP address. At 2150, the target SMF may receive a fifth message from the UPF. The fifth message may confirm the user plane session establishment or modification.

Figure 22:
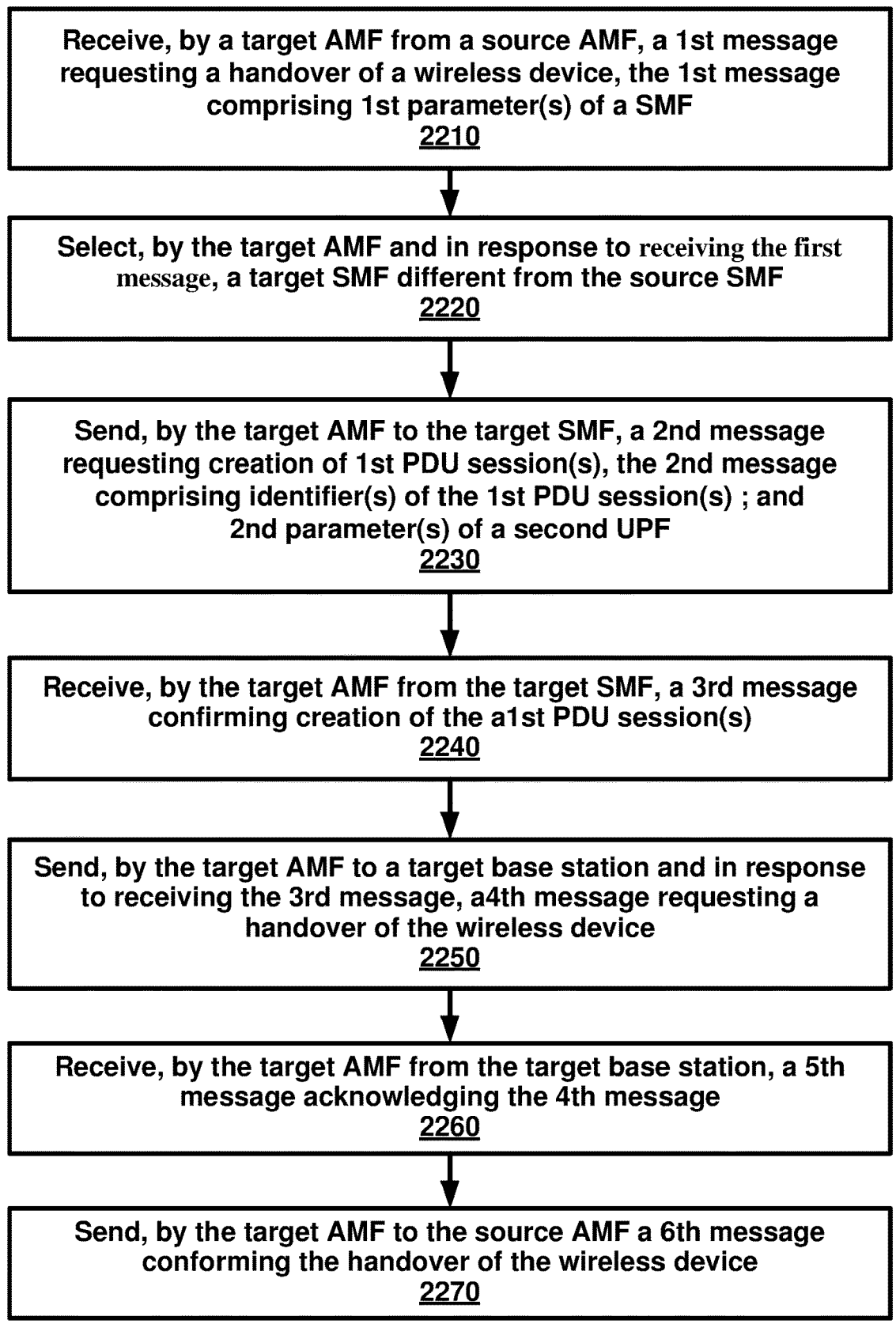
FIG. 22 is an example call flow diagram as per an aspect of an embodiment of the present invention.

FIG. 22 is a flow diagram of an aspect of an embodiment of the present disclosure. At 2210, a target access and mobility management function (AMF) may receiving a first message from a source AMF. The first message may request a handover of a wireless device. The first message may comprise one or more first parameters of a source session management function (SMF). At 2220, the target AMF may select a target SMF different from the source SMF in response to receiving the first message. At 2230, the target AMF may send a second message to the target SMF. The second message may request creation of at least one first packet data unit (PDU) session. The second message may comprise one or more identifiers of at least one first session. The second message may comprise one or more second parameters of a second UPF. At 2240, the target AMF may receive a third message from the target SMF. The third message may confirm creation of the at least one first PDU session. At 2250, the target AMF may send a fourth message to a target base station in response to receiving the third message. The fourth message may request a handover of the wireless device. At 2260, the target AMF may receive a fifth message from the target base station. The fifth message may acknowledge the fourth message. At 2270, the target AMF may send a sixth message to the source AMF. The sixth message may conform the handover of the wireless device.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in each of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples may be described above, it should be understood that they may be presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may also be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. Only a limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some Examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   sending, by a source access and mobility management function (AMF) to a target AMF, a first message indicating:
      a handover of a wireless device; and
      a source session management function (SMF);
   receiving, by the source AMF from the target AMF, a second message causing a release of at least one second session of the wireless device;
   sending, by the source AMF to the target AMF, a first indication of the completion of the release of the at least one second session;
   sending, by the source AMF to the source SMF, a request for the release of the at least one second session; and
   receiving, by the source AMF from the source SMF, a second indication of completion of the release of the at least one second session.

2. The method of claim 1, wherein the first message comprises at least one of:
   an identity of the source SMF; or
   an address of the source SMF.

3. The method of claim 1, further comprising:
   receiving, from the target AMF, a response message for the first message, the response message indicating a forward relocation response for the wireless device; and
   sending, to a source base station and based on the response message, a third message indicating a handover command for the wireless device.

4. The method of claim 1, wherein the target AMF:
   selects, in response to the handover, a target SMF different from the source SMF; and
   sends, to the target SMF, a third message indicating creation of at least one first session, the third message comprising at least one session identifier of the at least one first session.

5. The method of claim 4, wherein the third message further comprises at least one of:
   a single network slice selection assistance information;
   a network slicing instance identifier;
   a data network name; or
   a user identity of the wireless device.

6. The method of claim 4, wherein the first message further:
indicates establishment of the at least one first session; and
comprises at least one of:
the at least one session identifier of the at least one first session;
a first Internet protocol (IP) address of the wireless device; or
a data network name.

7. The method of claim 4, wherein the target SMF:
selects, a target user plane function (UPF) different from a source UPF; and
sends, to the target UPF, a fourth message requesting establishment of a session context for the at least one first session.

8. The method of claim 7, wherein the target SMF receives, from the target UPF, a fifth message acknowledging establishment of the session context.

9. The method of claim 4, wherein the at least one second session is established before the first session.

10. The method of claim 1, wherein the source SMF:
sends, to a source user plane function and in response to receiving the request for the release of the at least one second session, a user plane session release message requesting release of one or more user plane sessions of the at least one second session; and
receives, from the source UPF, an indication of release of the one or more user plane sessions.

11. A source access and mobility management function (AMF) comprising:
one or more processors;
memory storing instructions that, when executed by the one or more processors, cause the source AMF to:
send, to a target AMF, a first message indicating:
a handover of a wireless device; and
a source session management function (SMF);
receive, from the target AMF, a second message causing a release of at least one second session of the wireless device;
send, to the target AMF, a first indication of the completion of the release of the at least one second session;
send, to the source SMF, a request for the release of the at least one second session; and
receive, from the source SMF, a second indication of completion of the release of the at least one second session.

12. The source AMF of claim 11, wherein the first message comprises at least one of:
an identity of the source SMF; or
an address of the source SMF.

13. The source AMF of claim 11, wherein the instructions, when executed by the one or more processors, further cause the source AMF to:
receive, from the target AMF, a response message for the first message, the response message indicating a forward relocation response for the wireless device; and
send, to a source base station and based on the response message, a third message indicating a handover command for the wireless device.

14. The source AMF of claim 11, wherein the target AMF:
selects, in response to the handover, a target SMF different from the source SMF; and
sends, to the target SMF, a third message indicating creation of at least one first session, the third message comprising at least one session identifier of the at least one first session.

15. The source AMF of claim 14, wherein the third message further comprises at least one of:
a single network slice selection assistance information;
a network slicing instance identifier;
a data network name; or
a user identity of the wireless device.

16. The source AMF of claim 14, wherein the first message further:
indicates establishment of the at least one first session; and
comprises at least one of:
the at least one session identifier of the at least one first session;
a first Internet protocol (IP) address of the wireless device; or
a data network name.

17. The source AMF of claim 14, wherein the target SMF:
selects, a target user plane function (UPF) different from a source UPF; and
sends, to the target UPF, a fourth message requesting establishment of a session context for the at least one first session, wherein the target SMF receives, from the target UPF, a fifth message acknowledging establishment of the session context.

18. The source AMF of claim 17, wherein the at least one second session is established before the first session.

19. The source AMF of claim 11, wherein the source SMF:
sends, to a source user plane function and in response to receiving the request for the release of the at least one second session, a user plane session release message requesting release of one or more user plane sessions of the at least one second session; and
receives, from the source UPF, an indication of release of the one or more user plane sessions.

20. A system comprising:
a target access and mobility management function (AMF);
a source session management function (SMF); and
a source AMF comprising:
one or more processors;
memory storing instructions that, when executed by the one or more processors, cause the source AMF to:
send, to the target AMF, a first message indicating:
a handover of a wireless device; and
the source session management function (SMF);
receive, from the target AMF, a second message causing a release of at least one second session of the wireless device;
send, to the target AMF, a first indication of the completion of the release of the at least one second session;
send, to the source SMF, a request for the release of the at least one second session; and
receive, from the source SMF, a second indication of completion of the release of the at least one second session.

* * * * *